United States Patent
Hirosawa et al.

(10) Patent No.: US 6,434,276 B2
(45) Date of Patent: *Aug. 13, 2002

(54) IMAGE SYNTHESIS AND COMMUNICATION APPARATUS

(75) Inventors: Masashi Hirosawa, Tenri; Yasuhisa Nakamura, Joyo; Hiroshi Akagi, Nara; Shiro Ida, Kashihara, all of (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/162,024

(22) Filed: Sep. 28, 1998

(30) Foreign Application Priority Data

Sep. 30, 1997 (JP) .............................................. 9-266134

(51) Int. Cl.[7] .................................................. G06K 9/36
(52) U.S. Cl. ......................... 382/284; 358/450; 382/107
(58) Field of Search ................................. 382/284, 103, 382/107, 269, 278, 236; 348/407, 416, 699; 358/448, 450, 453

(56) References Cited

U.S. PATENT DOCUMENTS

| | | | | |
|---|---|---|---|---|
| 5,561,475 A | * | 10/1996 | Jung ........................... | 348/699 |
| 5,598,216 A | * | 1/1997 | Lee ............................ | 348/416 |
| 5,627,591 A | * | 5/1997 | Lee ............................ | 348/699 |
| 5,638,129 A | | 6/1997 | Lee | |
| 5,668,600 A | * | 9/1997 | Lee ............................ | 348/416 |
| 5,673,339 A | | 9/1997 | Lee | |
| 5,768,404 A | * | 6/1998 | Morimura et al. ........... | 382/107 |
| 5,933,535 A | * | 8/1999 | Lee et al. .................... | 348/699 |
| 5,978,030 A | * | 11/1999 | Jung et al. ................... | 348/416 |

FOREIGN PATENT DOCUMENTS

| | | |
|---|---|---|
| EP | 0 592 136 A2 | 4/1994 |
| EP | 0 720 383 A1 | 7/1996 |
| EP | 0 721 287 A1 | 7/1996 |
| JP | 59044184 A | 3/1984 |
| JP | 60203063 A | 10/1985 |
| JP | 05260264 A | 10/1993 |
| JP | 06086149 A | 3/1994 |

OTHER PUBLICATIONS

Patent Abstracts of Japan, vol. 1999, No. 7, Mar. 31, 1999 & JP 08 275178 A (Daewoo Electronics Co., Ltd) Oct. 18, 1996 (Abstract).

Irani, M. et al: "Video Compression Using Mosaic Representations" Signal Processing. Image Communications, NL, Elsevier Science Publishers, Amsterdam, vol. 7, No. 4/06, Nov. 1, 1995, pp. 529–552, XP000538027; ISSN 0923–5965. (Section 4.2, Fig. 6).

* cited by examiner

*Primary Examiner*—Jon Chang
*Assistant Examiner*—Jingge Wu
(74) *Attorney, Agent, or Firm*—David G. Conlin; Peter J. Manus; Dike Bronstein Roberts & Cushman

(57) ABSTRACT

In the case where an image of a document or the like is taken by an economical camera in a TV conference system and the image is transmitted and received through a communication line, when an image of the whole of the document is taken, small characters are defaced and illegible, and, when an imaging operation is performed with a resolution at which characters are readable, it is impossible to take an image of the whole of the document. An image F1 at time T1 which is taken while moving an imaging section is captured into an image storing section and a feature point extracting section. The feature point extracting section extracts feature points of the image F1. An image F2 at time T2 when the subsequent frame is started is captured into the image storing section and the feature point extracting section. The image F2 in a region designated by a search range determining section, and the feature points of the image F1 are subject to a calculation in a correlation calculating section, to obtain a motion amount, and then a high-resolution image is synthesized.

3 Claims, 17 Drawing Sheets

IMAGE SYNTHESIS AND COMMUNICATION APPARATUS

BACKGROUND OF THE INVENTION

1. Field of the Invention

The present invention relates to an image synthesis and communication apparatus which continuously captures images by using an imaging apparatus such as a video camera, detects a motion amount of an object image on an imaging plane, synthesizes a wide-angle and high-definition image on the basis of the detected motion amount, and transmits and receives data required for the synthesization.

2. Description of the Related Art

As a prior art, a technique is well known in which, in order to transmit a document image in a TV conference system, an imaging apparatus dedicated to a drawing, using a facsimile apparatus, a scanner, or the like is used in addition to an imaging apparatus for taking an image of attendants.

As another prior art, a technique is well known in which, in order to obtain a wide-angle image in a TV conference system or a TV phone system, the field angle of a lens itself is changed as in the case of a video camera, an imaging apparatus is rotated so as to pan the field of view, or a plurality of still pictures are combined together to be synthesized into one total screen as disclosed in Japanese Unexamined Patent Publication JP-A 59-44184 (1984).

As a further prior art, a technique is well known in which, in order to obtain a high-definition and wide-angle image by an economical imaging apparatus, as disclosed in Japanese Unexamined Patent Publication JP-A 5-260264 (1993), an image of a part of an object is taken with a desired resolution, the object is scanned by rotating or moving the imaging apparatus, and the obtained images are synthesized together.

When images are to be synthesized together, the motion amounts of images must be calculated. This calculation can be performed by several methods.

The representative point method is used mainly in compensation of motion such as a shake of a video camera.

FIG. 19 diagrammatically shows the representative point method. In the method, for continuously captured images, a representative point is set at a fixed position in the image of the previous frame, and, for an image of a current frame, a correlation calculation and an accumulative addition operation are performed on corresponding pixels while conducting a two-dimensional shifting operation. An amount from which the highest calculation value is obtained is detected as a motion amount.

Japanese Unexamined Patent Publication JP-A 6-86149 (1994) discloses a technique in which a Laplacian filter or the like is applied at a preset representative point, a luminance gradient is obtained, and a calculation is performed by using the obtained value, thereby enhancing the accuracy.

A motion amount may be detected also by using the block matching method in which a correlation calculation is performed on duplicated portion of images to determine a position where synthesization is to be conducted. FIG. 20 diagrammatically shows the block matching method. In the method, a specific region which is to be referred is set in the image of the previous frame, a correlation calculation is performed on the image of the current frame while conducting a two-dimensional shifting operation, and a motion amount is obtained in the same manner as the representative point method. In the representative point method, it is required only to obtain correlations from several points and then perform an accumulative addition. By contrast, in the block matching method, an accumulative addition must be performed on all points in the specific region, and hence processing of a higher speed is required.

Among cameras dedicated to a drawing and television cameras used in a facsimile apparatus in the prior art, a low-resolution and narrow-angle camera which is economical has a disadvantage that, in an operation of imaging a document or the like, when an image of the whole of the document is taken, small characters are defaced and illegible, and, when an imaging operation is performed with a resolution at which characters are readable, it is impossible to grasp the whole of the document.

The prior art in which the field angle of a lens itself is changed has a disadvantage that, when the field of view is widened, the resolution is impaired.

The prior art in which an imaging apparatus is rotated has a disadvantage that a wide-angle image cannot be obtained by a single operation.

The technique of Japanese Unexamined Patent Publication JP-A 59-44184 (1984) has a disadvantage that an image cannot be synthesized with a high accuracy and synthesization cannot be attained in an imaging operation in which a hand-held camera is swung. The technique has another disadvantage that a synthesizing apparatus must be disposed in a camera.

In the prior art technique disclosed in Japanese Unexamined Patent Publication JP-A 5-260264 (1993) in which partial images are synthesized together to obtain a high-definition and wide-angle image, there is a disadvantage that, when this technique is combined with a communication system, the transmission side must be provided with a synthesizing apparatus.

Even in the case where synthesization is performed in the receiver side, when all partial images are simply transmitted, data of an amount which is greater than that required in synthesization are transmitted. This produces a disadvantage that the transmission amount is wastefully increased.

Among the methods of detecting a motion amount, in the representative point method, a certain representative point must have a luminance gradient of a given degree. When black and white data such as a document image are to be handled, for example, there arises a problem in that the luminance gradient is low in all representative points and a motion amount cannot be correctly detected.

In other words, the method is effective when the luminance gradient is uniformly distributed in an object image. In the case where the luminance gradient is not uniformly distributed, such as the case of a document having a large background, a low luminance gradient is obtained in the background and hence it is difficult to detect a motion amount.

By contrast, the block matching method has a problem in that the method requires a large amount of calculation and hence it is difficult to detect a motion amount in real time.

SUMMARY OF THE INVENTION

It is an object of the invention to provide an image synthesis and communication apparatus which, by using a low-resolution and narrow-angle camera that is economical, can obtain a motion amount between images accurately and rapidly from an object image wherein the luminance gradient is not uniform, such as a document image, synthesize a high-definition and wide-angle image, and handle such an image by means of communication.

In order to attain the object, in a first aspect of the invention there is provided an image synthesis and communication apparatus comprising:

imaging means for inputting images in time series;

image storing means for storing the images inputted from the imaging means;

feature point extracting means for extracting a point of a large luminance change from an image of a current frame, as a feature point;

search range determining means for determining a predetermined region of an image of a subsequent frame, as a search range for a correlation calculation;

correlation calculating means for obtaining correlations between the feature point and pixels in the search range;

image synthesizing means for synthesizing an image on the basis of a motion amount obtained from the correlation calculating means;

image transmitting means for transmitting an image obtained from the image synthesizing means; and image receiving means for receiving the image transmitted from the image transmitting means.

Preferably, the search range determining means determines the search range on the basis of a motion amount obtained from images of current and previous frames.

Preferably, the feature point extracting means extracts, as a feature point, a point of a large luminance change from plural regions where coordinates in one direction coincide with one another in an image of a current frame, the search range determining means determines a search range for a correlation calculation, for each of the regions of a subsequent frame, and the correlation calculating means performs a correlation calculation for each of the regions.

In another aspect of the invention, in order to attain the object, there is provided an image synthesis and communication apparatus comprising:

imaging means for inputting images in time series;

image transmitting means for transmitting images obtained from the imaging means;

image receiving means for receiving the images transmitted from the image transmitting means;

image storing means for storing the images inputted from the image receiving means;

feature point extracting means for extracting a point of a large luminance change from an image of a current frame, as a feature point;

search range determining means for determining a predetermined region of an image of a subsequent frame, as a search range for a correlation calculation;

correlation calculating means for obtaining correlations between the feature point and pixels in the search range; and image synthesizing means for receiving a motion amount obtained from the correlation calculating means, and synthesizing an image.

Preferably, the search range determining means determines the search range on the basis of a motion amount obtained from images of current and previous frames.

Preferably, the feature point extracting means extracts, as a feature point, a point of a large luminance change from plural regions where coordinates in one direction coincide with one another in an image of a current frame, the search range determining means determines a search range for a correlation calculation, for each of the regions of a subsequent frame, and the correlation calculating means performs a correlation calculation for each of the regions.

In still another aspect of the invention, in order to attain the object, the image synthesis and communication apparatus comprising:

imaging means for inputting images in time series;

image storing means for storing the images inputted from the imaging means;

feature point extracting means for extracting a point of a large luminance change from an image of a current frame, as a feature point;

search range determining means for determining a predetermined region of an image of a subsequent frame, as a search range for a correlation calculation;

correlation calculating means for obtaining correlations between the feature point and pixels in the search range;

update image calculating means for obtaining an image of a newly-imaged portion from the motion amount obtained from the correlation calculating means;

image transmitting means for transmitting the motion amount obtained from the correlation calculating means, and a partial image obtained from the update image calculating means;

image receiving means for receiving the motion amount and the partial image transmitted from the image transmitting means; and image synthesizing means for synthesizing an image from the motion amount and the partial image obtained from the image receiving means.

Preferably, the search range determining means determines the search range on the basis of a motion amount obtained from images of current and previous frames.

Preferably, the feature point extracting means extracts, as a feature point, a point of a large luminance change from plural regions where coordinates in one direction coincide with one another in an image of a current frame, the search range determining means determines a search range for a correlation calculation, for each of the regions of a subsequent frame, and the correlation calculating means performs a correlation calculation for each of the regions.

As described above, according to the invention, plural images of a part of an object are taken, the images are synthesized together, and a resulting image is transmitted. Even when a low-resolution and narrow-angle camera is used as the imaging means, therefore, a wide-angle and high-definition image can be transmitted to a remote place.

The place where the image synthesization is performed is not restricted to the transmission side where an image of an object is taken. When obtained images are transmitted as they are from the transmission side and the images are synthesized together in the reception side, a wide-angle and high-definition image can be obtained in the reception side by using a low-resolution and narrow-angle camera and a transmission facility even in the case where the transmission side has only a conventional TV phone system, TV conference system, or the like.

When obtained images are to be transmitted from the transmission side, the obtained images are not transmitted as they are, but only portions of the obtained images which are judged as not overlapping with the previous image by checking the overlapping state of the images with respect to the previous image are transmitted. Therefore, it is possible to transmit only images of a minimum necessary total size, and hence the information amount in the communication can be reduced.

Even in the case where the luminance gradient is not uniformly distributed, a motion amount among images in time series which is basic to the image synthesization can be obtained by a correlation calculation using an arbitrary point as a feature point. Therefore, the motion amount can be accurately detected also from an object having a white background, such as a document. The invention is superior in accuracy than the representative point method.

As compared with the block matching method, the amount of calculation can be reduced by two orders and hence it is possible to perform a real time processing at a frame rate.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
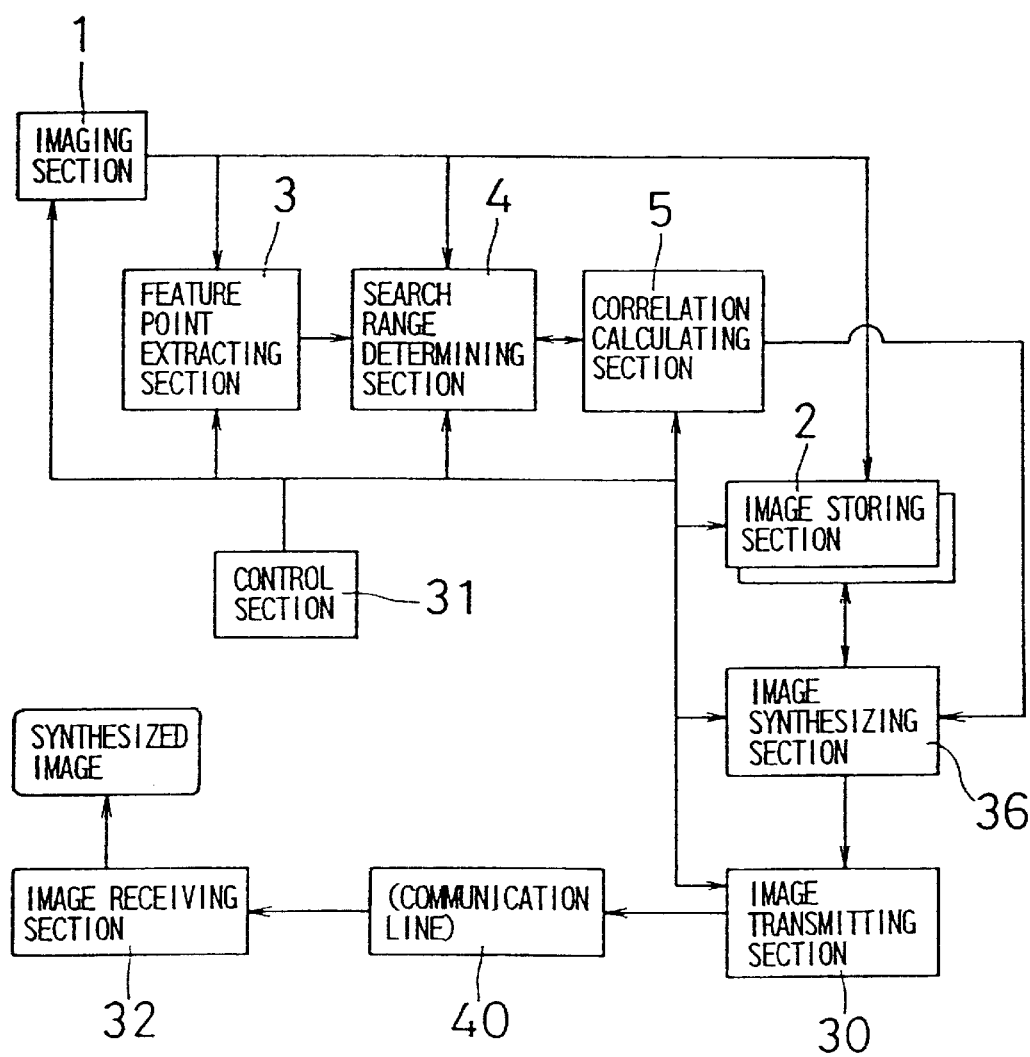
FIG. 1 is a block diagram showing the configuration of an image synthesis and communication apparatus of a first embodiment of the invention.

Now referring to the drawings, preferred embodiments of the invention are described below.

FIG. 1 is a block diagram showing an image synthesis and communication apparatus of a first embodiment of the invention. The image synthesis and communication apparatus comprises: an imaging section 1 which is realized by an optical system for taking an image, a CCD, or the like; an image storing section 2 which stores image data transferred from the imaging section 1; a feature point extracting section 3 which extracts a point used for a pixel calculation; a search range determining section 4 which determines a search range for a correlation calculation; a correlation calculating section 5 which obtains correlations among pixels and outputs a motion amount; an image synthesizing section 36 which synthesizes an image; an image transmitting section 30 which transmits the synthesized image; a control section 31 which controls the components 1 to 5, 30, and 36; and an image receiving section 32 which receives the synthesized image.

The image receiving section 32 may be disposed integrally with the image transmitting section 30 in the image synthesis and communication apparatus which is used mainly as a transmission side. Alternatively, the image receiving section may be independently disposed so as to be separated from the apparatus, or may be disposed in another image synthesis and communication apparatus existing in a remote place.

Figure 4:
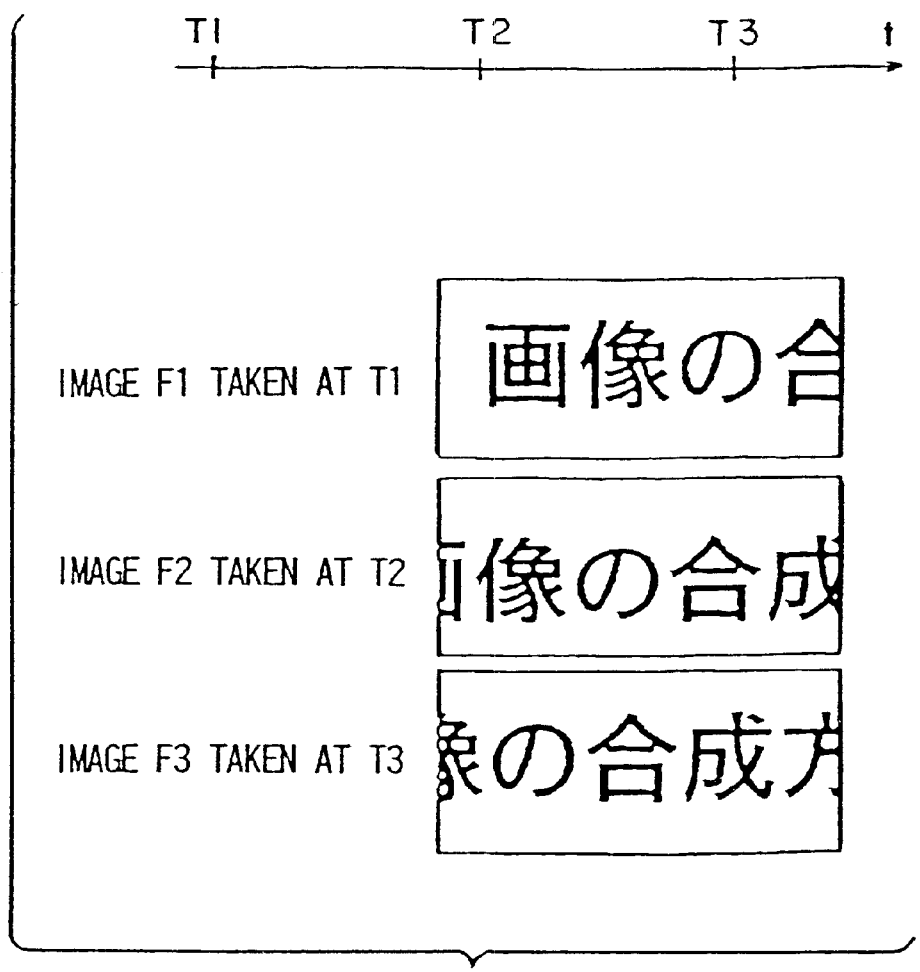
FIG. 4 is a view showing images which are continuously taken in the image synthesization of the invention.

Next, an operation of taking an image of a document in which black characters are written on a white background, while manually moving the imaging section 1 will be described with reference to FIG. 4 showing midway states of the operation.

FIG. 4 shows midway portions of images which are continuously taken at constant time intervals.

The reference numerals T1, T2, T3, . . . designate start times of the image capturing. Captured images are indicated by reference numerals F1, F2, F3, . . . . During a period between times T1 and T2, the image F1 is captured through the imaging section 1 and then stored into the image storing section 2. At the same time, the image is sent also to the feature point extracting section 3 and feature points of the image F1 are extracted.

Next, during a period between times T2 and T3, the image F2 is captured and then stored into the image storing section 2. At the same time, the image is sent also to the feature point extracting section 3 and all feature points of the image F2 are extracted.

During the period between times T2 and T3, also a correlation calculation is performed in the correlation calculating section 5 on all the feature points of the image F1 extracted during a period between times T1 and T2 in the previous frame, and all pixels in the neighborhood of specific positions in the image F2 respectively corresponding to the feature points. The specific positions in the image F2 are corrected by a motion amount which is obtained in the previous frame between times T1 and T2.

During the period between times T2 and T3, after the correlation calculation is performed, a motion amount obtained in the correlation calculating section 5 is sent to the image synthesizing section 36 and an image synthesization is conducted.

In the same manner, also during the periods subsequent to time T3, a process similar to that performed during the period between times T2 and T3 is repeated while feature points of the current frame are used as reference images, and regions in the neighborhood of specific positions of the subsequent frame as search images.

Figure 5:
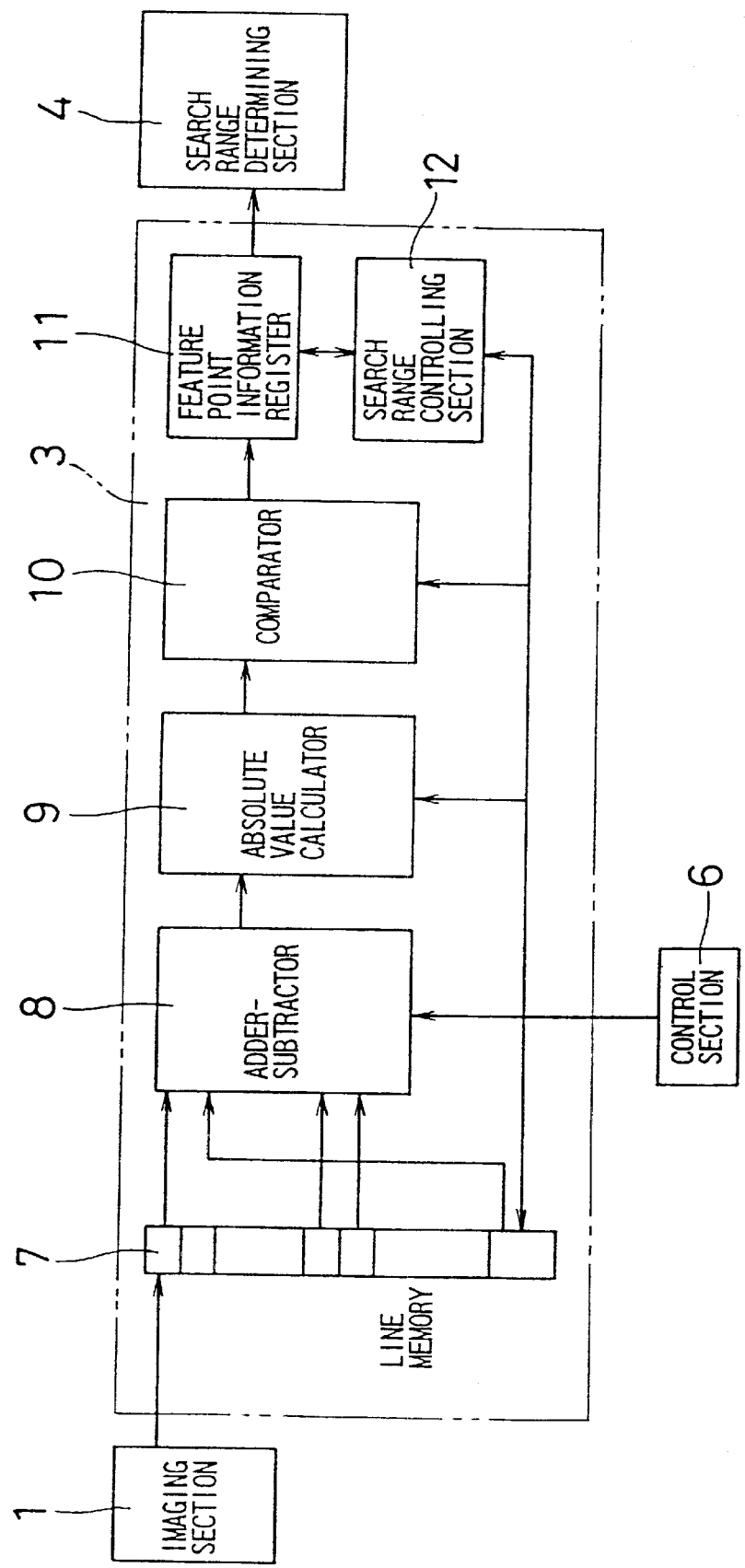
FIG. 5 is a block diagram of a feature point extracting section 3 of the image synthesis and communication apparatus of the invention.

Next, an operation of extracting a feature point will be described. FIG. 5 shows the configuration of the feature point extracting section 3. The feature point extracting section 3 comprises: a line memory 7 which concurrently reads adjacent pixels; an adder-subtractor 8 which obtains a luminance gradient; an absolute value calculator 9 which obtains the absolute value of the luminance gradient; a comparator 10 which judges whether the luminance gradient exceeds a threshold or not; a feature point information register 11 which stores the luminances and coordinates of obtained feature points; and a search range controlling section 12 which controls the search range.

Figure 6:
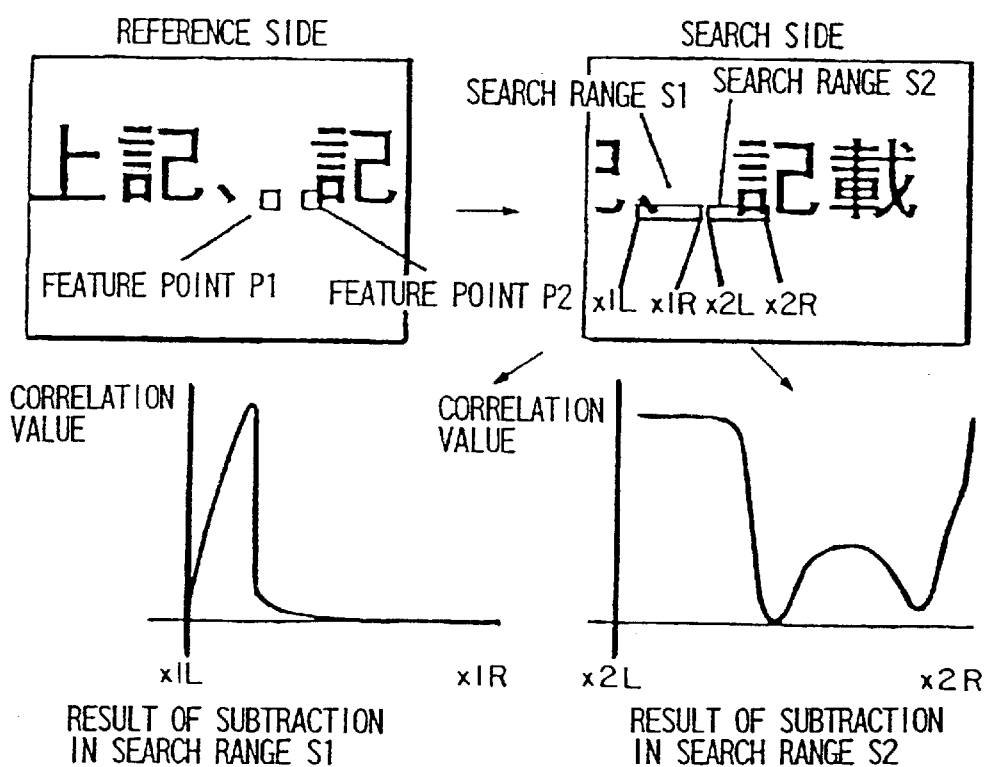
FIG. 6 is a diagram illustrating an advantage of a technique of the invention in which a point of a high luminance gradient is selected.

An advantage of a technique in which a feature point of a high luminance gradient is selected will be described with reference to FIG. 6. A high luminance gradient means a large difference between adjacent pixels and corresponds to an edge portion of a character in a document image. It is assumed that the absolute value of a difference is used in a correlation calculation.

If a point of a low luminance gradient such as a portion of a background is set as a feature point, the luminance gradients of adjacent pixels are substantially equal to one another. Therefore, a difference is not produced in a subtraction result in a certain range.

By contrast, if a point of a high luminance gradient is set as a feature point, values of adjacent pixels are different from each other, and hence a difference is produced in a subtraction result in a certain range. Specifically, when a feature point P1 of FIG. 6 in which the luminance is changed at a small degree is employed and subtraction is performed with respect to a search range S1, results are obtained as shown in the graph of the lower left side. The minimum value is obtained in most points, and hence it is difficult to determine a motion amount. By contrast, when a feature point P2 of FIG. 6 is employed and subtraction is performed with respect to a search range S2, results are obtained as shown in the graph of the lower right side. As a result, candidates of the motion amount are substantially restricted to two points. This means that candidates of the motion amount can be further restricted by employing other feature points and performing an accumulative addition of subtraction results with respect to the search range, for each pixel of the search range.

Referring again to FIG. 5, the operation of extracting a feature point will be described. In the invention, the feature point extraction is performed on the basis of a judgement whether the luminance gradient exceeds a certain threshold or not, i.e., whether the absolute difference of adjacent pixels exceeds the certain threshold or not. If the difference exceeds the certain threshold, the luminance and coordinates of the feature point are transferred to the search range determining section 4. When a feature point is to be detected, data of each pixel are first read into the line memory 7 in synchronization with the data transfer from the imaging section 1 to the image storing section 2.

The line memory 7 has a buffer for one line and is configured so that a certain pixel and 4-neighboring pixels are simultaneously referred by the adder-subtractor 8. The adder-subtractor 8 obtains the difference between adjacent pixel values and the absolute value calculator 9 obtains the absolute value of the difference. The absolute value is transferred to the comparator 10. The comparator 10 judges whether the absolute value is larger than the threshold or not. The luminances and coordinates of an applicable pixel, and a feature point number indicative of the order of the extraction of the feature point are stored into the feature point information register 11.

The search range controlling section 12 is used for preventing a feature point which is further inside the search region than the coordinates stored in the feature point information register 11, from being newly stored. This can be realized by a control in which a feature point on the reference side is uniquely determined for an image of the search side. Specifically, such a control can be realized by obtaining the distances in the x and y directions between the coordinates of the feature point stored in the feature point information register 11 and those of the feature point to be obtained, and, when the distance is equal to or smaller than a fixed value, not setting as a feature point. According to this configuration, the feature point extraction can be performed in parallel with the operation of capturing an image.

Figure 7:
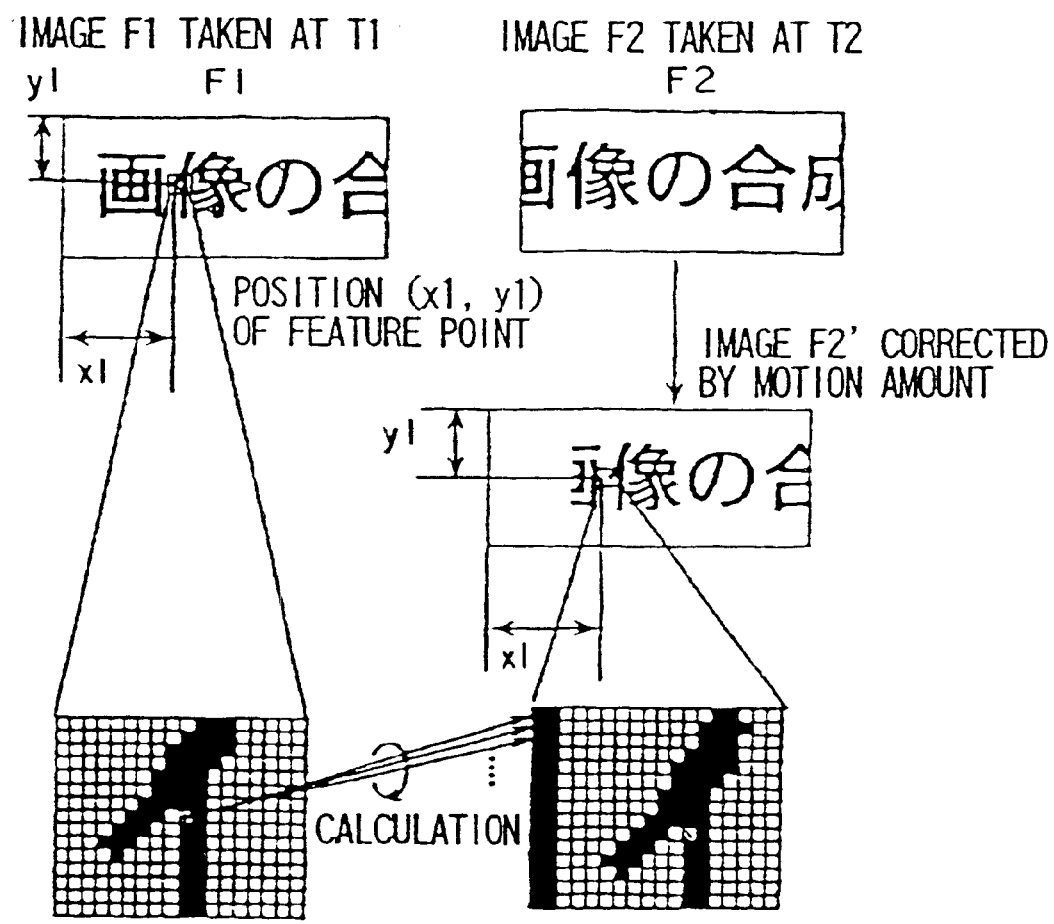
FIG. 7 is a diagram illustrating the configuration of a correlation calculating section 5 of the image synthesis and communication apparatus of the invention.

Next, operations of determining a search range for a correlation calculation and performing a correlation calculation will be described with reference to FIGS. 7 and 8. FIG. 7 shows a feature point obtained by the feature point extracting section 3, and a concept of a correlation calculation. The upper left image is the image F1 which is taken at time T1, and the upper right image is the image F2 which is taken at time T2.

Figure 8:
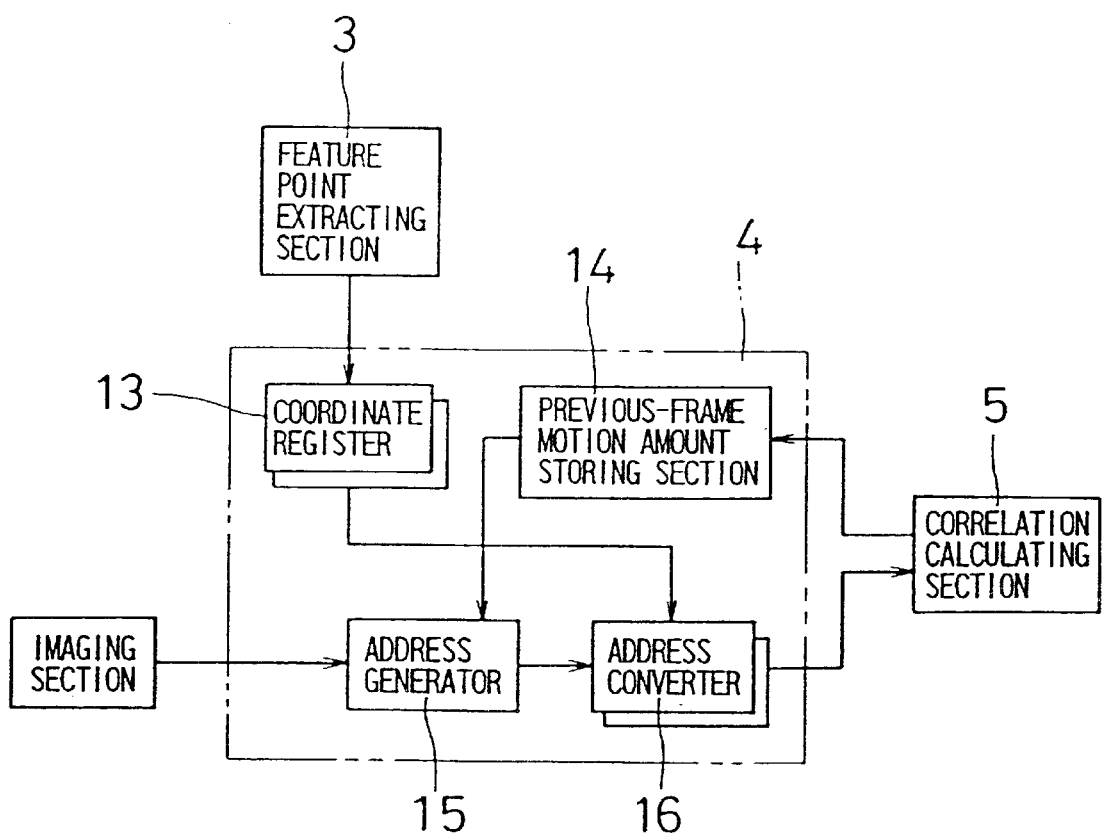
FIG. 8 is a block diagram of a search range determining section 4 of the image synthesis and communication apparatus of the invention.

FIG. 8 is a block diagram showing the search range determining section 4. The search range determining section 4 comprises: a coordinate register 13 which stores coordinates of feature points transferred from the feature point extracting section 3; a previous-frame motion amount storing section 14 which stores the motion amount obtained by the correlation calculating section 5; an address generator 15 which generates coordinates corrected by the motion amount of the previous frame; and an address converter 16 which performs a conversion process on the basis of the values of the address generator 15 and the coordinate register 13, to obtain an address in which the upper right end point of the search range is set as the origin, and a feature point number.

First, during a period between times T1 and T2, all feature points of the image F1 are obtained, and, at time T2, stored into the coordinate register 13. Next, during a period between times T2 and T3, the image F2 is sent from the imaging section 1 to the image storing section 2 and feature points of the image F2 are obtained. At the same time, the value which is corrected by the motion amount of the previous frame in the address generator 15 is sent to the address converter 16. At the timing of starting the imaging operation, the initial value of a motion amount is set to be 0. For example, the address converter 16 is configured so as to have difference circuits and comparison circuits of a number which is equal to that of feature points. According to this configuration, either of feature points is designated, the relative position is obtained in the search range, and the results are sent in synchronization with the luminance of the corresponding address to the correlation calculating section 5. Referring again to FIG. 7, the feature point extracting section 3 determines a middle point of the portion "1" of "像 (Chinese character)" which is displayed, as a feature point, and the address of the feature point is sent to the coordinate register 13. The address generator 15 converts the address into an address which is corrected by the motion amount. This results in the generation of an image F2' of FIG. 7.

As a result, when the motion amount of the current frame is equal to that of the previous frame, a point of the same address as that of the feature point should be the corresponding point. It is preferable to perform the correlation calculation while searching the neighborhood of the region which is corrected by the motion amount of the previous frame. Therefore, the address converter 16 generates an image of M×N pixels which is centered at the same coordinates as those of the feature point. This corresponds to the lower right image in FIG. 7. Results of a correlation calculation on the luminance of the feature point of the image F1 and the luminance of M×N pixels of the image F2' captured from the imaging section are outputted. For each of the other feature points of the same frame, similarly, an image of M×N pixels is generated and a correlation calculation is performed.

The correlation calculating section 5 will be described. For example, the correlation calculating section 5 obtains (x, y) satisfying the following expressions:

$$\{\min(F(x,y))|0 \leq x < M, 0 \leq y < N\} \quad (1)$$

$$F(x, y) = \sum_{i=0}^{k} (S(x, y)(i) - R(i)) \quad (2)$$

where k is the number of the feature points, M is the search width of a motion amount in the lateral direction, N is the search width of a motion amount in the vertical direction, S(x, y)(i) is the luminance of a pixel on the search side and corresponding to an i-th feature point in the case where the motion amount is (x, y), and R(i) is the luminance of feature point i.

In the case where the motion amount is (x, y), the feature point coordinates (xR, yR) of the image F1 and the coordinates (xT, yT) of a pixel corresponding to the feature point of the image F2' have the mutual relationships of xT=xR+x and yT=yR+y.

Figure 9:
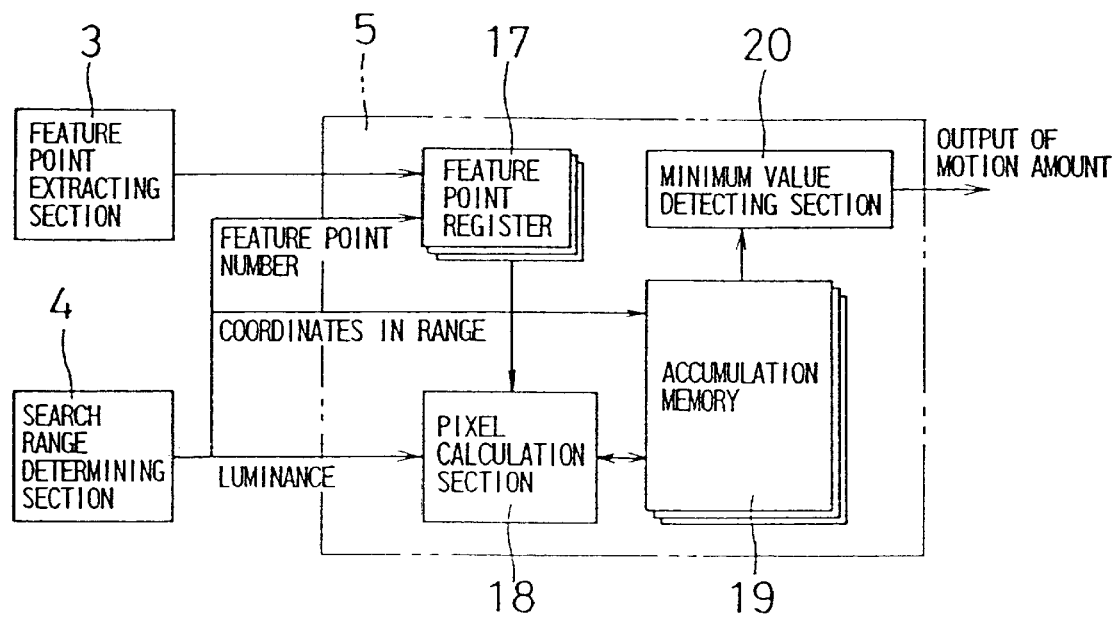
FIG. 9 is a diagram illustrating a procedure of determining a search range for a correlation calculation in the invention.

Next, the operation of detecting a motion amount will be described. FIG. 9 is a block diagram of the correlation calculating section 5. The correlation calculating section 5 comprises: a feature point register 17 which stores the luminance of the feature point obtained by the feature point extracting section 3; a pixel calculation section 18 which obtains a correlation of pixels; an accumulation memory 19 which stores an accumulation value; and a minimum value detecting section 20 which obtains the minimum value.

Based on the feature point number generated in the search range determining section 4, the corresponding feature point of the feature point register 17 is selected and sent to the pixel calculation section 18. At the same time, a corresponding section of the accumulation memory 19 is selected as the coordinates in the range. Furthermore, the luminance is given, the correlation value is obtained by a difference-sum operation, and the obtained value is returned to the accumulation memory 19. When a process for one frame is ended, the minimum value detecting section 20 detects a portion of the minimum correlation value from the M×N pixels on the search side of the accumulation memory 19, and outputs it as a motion amount. According to this configuration, a motion amount can be accurately detected in real time.

Figure 10:
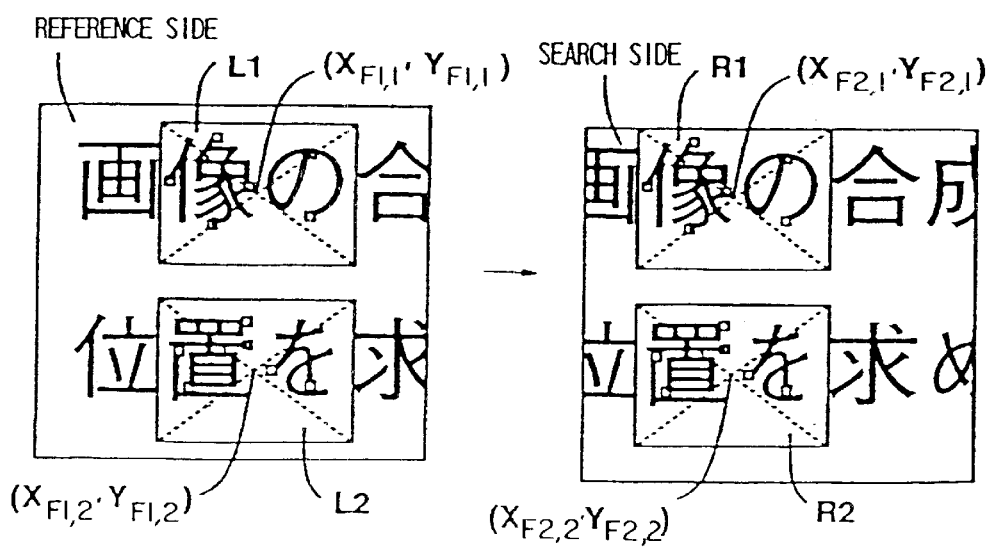
FIG. 10 is a diagram illustrating a procedure of detecting an affine transformation in the invention.

In the invention, the search range can be arbitrarily set, and hence a modification may be done, for example, in the following manner. The section where the coordinates in the range to be outputted from the search range determining section 4 are generated is slightly changed. As shown in FIG. 10, rectangular regions L1 and L2 on the reference side are set. For each of the rectangular regions L1 and L2, extraction of a feature point and the search range are determined. A correlation calculation is performed on each region, and two motion amounts are detected. As a result, it is possible to obtain parameters of an affine transformation including rotation, expansion, and reduction. Specifically, as shown in FIG. 10, a feature amount is obtained from each of the rectangular regions L1 and L2, a correlation calculation with respect to an image on the search side is performed, and rectangular regions R1 and R2 which respectively coincide with the rectangular regions L1 and L2 are obtained.

The center coordinates of the rectangular regions L1 and L2 are (X(F1, 1), Y(F1, 1)) and (X(F1, 2), Y(F1, 2)), those of the rectangular regions R1 and R2 are (X(F2, 1), Y(F2, 1)) and (X(F2, 2), Y(F2, 2)). When arbitrary coordinates on the reference side are indicated by $(X_L, Y_L)$ and those on the search side by $(X_R, Y_R)$, the coordinates are mutually affine-transformed by the following expressions:

$$\begin{bmatrix} X_R \\ Y_R \end{bmatrix} = \frac{1}{X_{F1,1}Y_{F1,2} - X_{F1,2}Y_{F1,1}} \times \quad (3)$$

$$\begin{bmatrix} X_{F2,1}Y_{F2,2} - X_{F2,2}Y_{F1,1} & -X_{F2,1}X_{F1,2} + X_{F2,2}X_{F1,1} \\ Y_{F2,1}Y_{F1,2} - Y_{F2,2}Y_{F1,1} & -Y_{F2,1}X_{F1,2} + Y_{F2,2}X_{F1,1} \end{bmatrix}$$

$$\begin{bmatrix} X_L \\ Y_L \end{bmatrix}$$

(where $X_{F1,1}$ has the same meaning as X(F1, 1) in the description)

$$\begin{bmatrix} X_L \\ Y_L \end{bmatrix} = \frac{1}{X_{F2,1}Y_{F2,2} - X_{F2,2}Y_{F2,1}} \times \quad (4)$$

$$\begin{bmatrix} X_{F1,1}Y_{F2,2} - X_{F1,2}Y_{F2,1} & -X_{F1,1}X_{F2,2} + X_{F1,2}X_{F2,1} \\ Y_{F1,1}Y_{F2,2} - Y_{F1,2}Y_{F2,1} & -Y_{F1,1}X_{F2,2} + Y_{F1,2}X_{F2,1} \end{bmatrix}$$

$$\begin{bmatrix} X_R \\ Y_R \end{bmatrix}$$

Next, the calculation time period in the case where the invention is employed will be described in comparison with the block matching method of the prior art.

In the feature point method, the time period required for detecting feature points is proportional to the area of an image to be referenced, and that required for a correlation calculation is proportional to the area of the search region and the number of the feature points.

When the area of an image to be referenced is 320 pixels×240 pixels, the number of feature points to be detected is 25, and the search range is 20 pixels×20 pixels, the time period required for a calculation is 78,000×α+10,000×β where α is the calculation amount per pixel in the case where a luminance gradient is obtained and β is the calculation amount per pixel for obtaining correlation between pixels.

By contrast, in the case where the block matching method is used, the time period is 20×20×320×240 β=30,720,000 β. Assuming that α and β are calculation amounts which are substantially equal to each other, the time period required for a calculation in the feature point method is 88,000 β. As a result, the block matching method requires a calculation amount which is 300 or more times that required in the feature point method.

Figure 11:
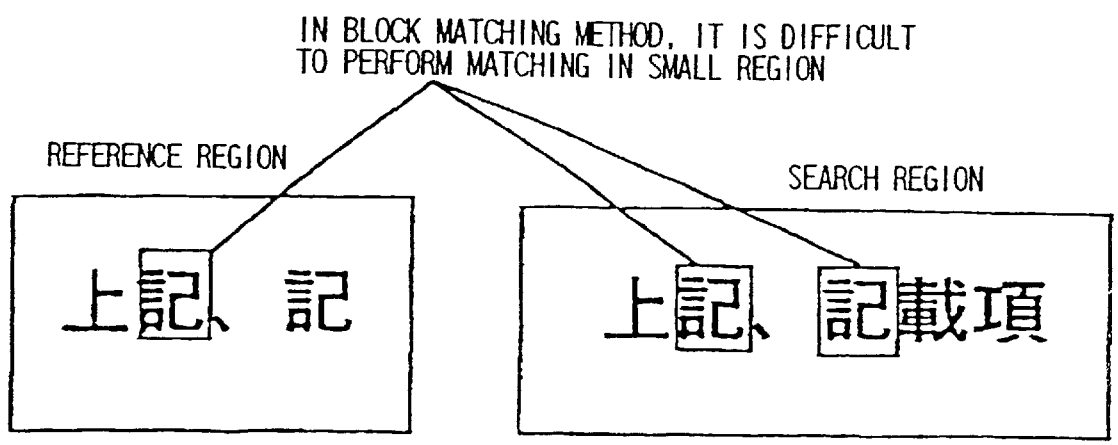
FIG. 11 is a diagram illustrating a problem of the block matching method in the invention.

In the block matching method also, when the luminance change is observed and the reference region is suppressed to about 25, the calculation amount is reduced to the same degree as described above. In a case such as that, as shown in FIG. 11, identical characters on the search side are substantially juxtaposed, it is difficult to perform the matching and the motion amount cannot be determined. In such a case, therefore, results are extremely impaired.

Next, the image synthesizing section will be described.

Figure 12:
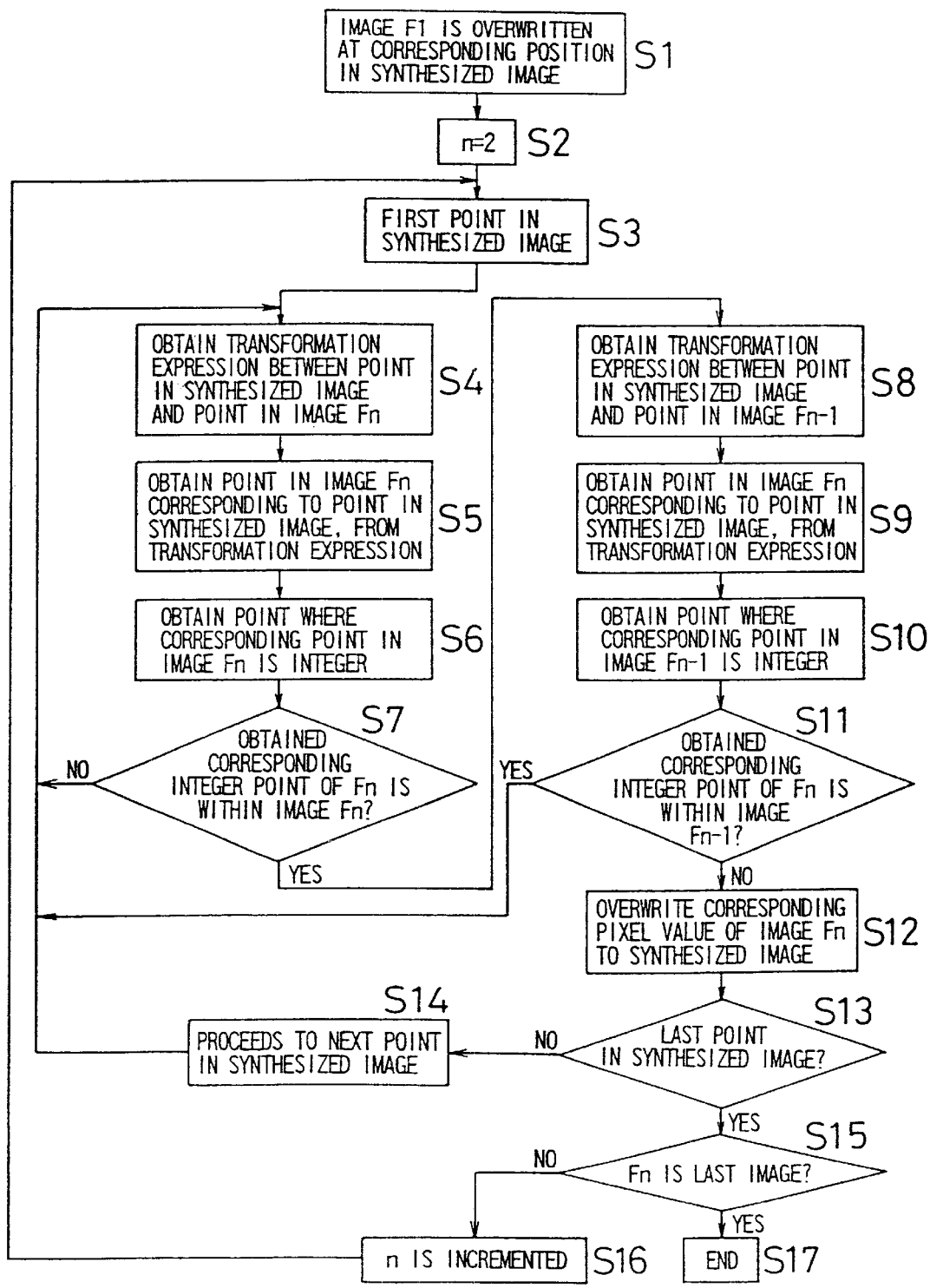
FIG. 12 is a flowchart of a synthesizing process in the invention.

FIG. 12 is a flowchart showing the flow of a synthesizing process.

As a memory for storing a synthesized image, the image storing section 2 is used. Another region which is different from that for storing the image sent from the imaging section 1 is previously allocated to a synthesized image.

Figure 13:
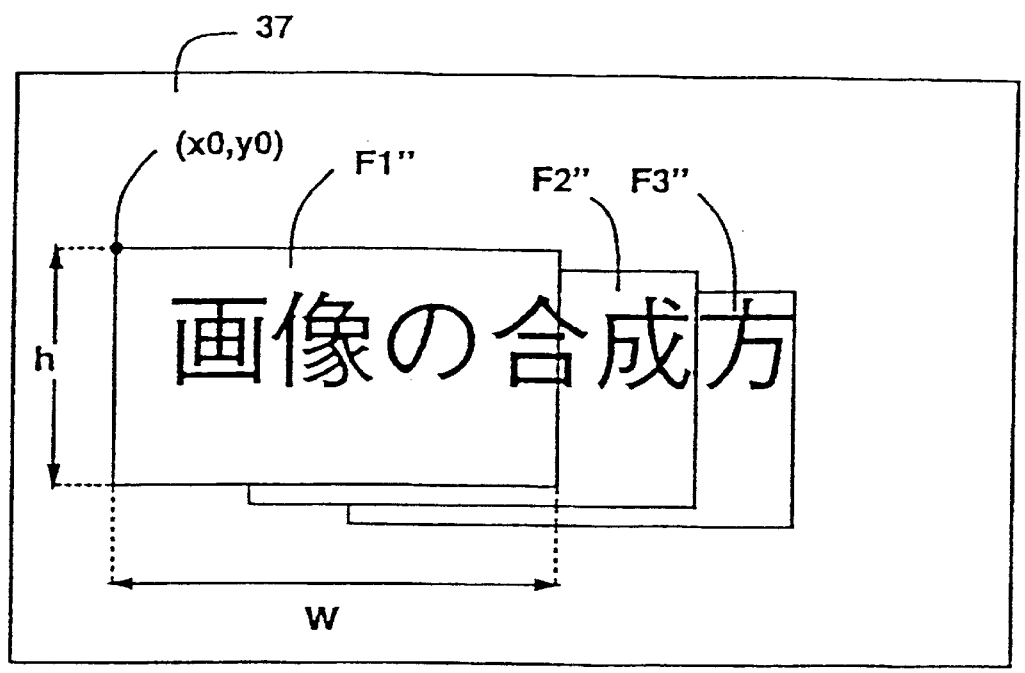
FIG. 13 is a diagram illustrating a manner of a synthesized image in the invention.

The other region corresponds to a synthesized-image memory 37 shown in FIG. 13.

The upper left end point of the synthesized-image memory 37 is set as the origin. Hereinafter, a pixel at position (x, y) is indicated by f(x, y). A memory can be accessed by designating an address. When the width of the synthesized-image memory 37 is w and the address of the origin is z, the address of f(x, y) is represented by z+y×w+x.

The first image F1 is overwritten onto the synthesized-image memory 37 so that the upper left point of F1 is located at $(x_0, y_0)$ of the synthesized-image memory 37 (step S1). Initial position $(x_0, y_0)$ is previously determined. It is assumed that a pixel of F1 can be accessed by $g_1(x, y)$. In the same manner as f(x, y), the address of each pixel can be calculated by using the width of F1 and the address of the origin. The overwriting operation can be shown by using an expression of $f(x+x_0, y+y_0)=g_1(x, y)$ (where $0 \leq x \leq w_1$, $0 \leq y < h_1$, $w_1$ is the width of F1, and $h_1$ is the height of F1).

Next, the overwriting operation is performed only on the portion of the image F2 which portion does not overlap with the image F1. FIG. 13 shows a state in which the images F1, F2, and F3 are overwritten.

In the case where the motion amount obtained from the correlation calculating section 5 includes not only parallel movement but also rotation, expansion, and reduction, it is obtained in the form of a matrix of an affine transformation described above. It is assumed that, in the image F1 and the second image F2, the correspondence positions in the two regions of each of the images, i.e., the rectangular regions L1 and L2, and R1 and R2 are previously obtained. When the center coordinates of the rectangular regions L1 and L2 of the first image F1 are (X(F1, 1), Y(F1, 1)) and (X(F1, 2), Y(F1, 2)) and those of the rectangular regions R1 and R2 of the second image F2 are (X(F2, 1), Y(F2, 1)) and (X(F2, 2), Y(F2, 2)), the following parameters of an affine transformation from the first image F1 to the second image F2:

$$\frac{1}{X_{F1,1}Y_{F1,2} - X_{F1,2}Y_{F1,1}} \quad (5)$$

$$\begin{bmatrix} X_{F2,1}Y_{F1,2} - X_{F2,2}Y_{F1,1} & -X_{F2,1}X_{F1,2} + X_{F2,2}X_{F1,1} \\ Y_{F2,1}Y_{F1,2} - Y_{F2,2}Y_{F1,1} & -Y_{F2,1}X_{F1,2} + Y_{F2,2}X_{F1,1} \end{bmatrix}$$

are obtained by the correlation calculating section 5 in accordance with the above-mentioned expression of an affine transformation (step S4). In order simplify the expression, hereinafter the expression is expressed by:

$$\begin{bmatrix} A_{1,2} & B_{1,2} \\ C_{1,2} & D_{1,2} \end{bmatrix} \quad (6)$$

When an affine transformation is not performed and only a parallel movement is to be performed, $B_{1,2}$ and $C_{1,2}$ are 0.

A pixel position in the second image F2 is indicated by $(X_{F2}, Y_{F2})$, and a corresponding pixel position in the synthesized image to be overwritten is indicated by $(X'_{F2}, Y'_{F2})$. When the upper left point of the first image F1 is located at $(x_0, y_0)$ of the synthesized-image memory 37, the transformation expression is defined by the following expression:

$$\begin{bmatrix} X_{F2} \\ Y_{F2} \end{bmatrix} = \begin{bmatrix} A_{1,2} & B_{1,2} \\ C_{1,2} & D_{1,2} \end{bmatrix} \begin{bmatrix} X'_{F2} - x_0 \\ Y'_{F2} - y_0 \end{bmatrix}$$

$$f(X'_{F2}, Y'_{F2}) = g_2(\text{round}(X_{F2}), \text{round}(Y_{F2}))$$
$$= g_2(\text{round}(A_{1,2}(X'_{F2} - x_0) + B_{1,2}(Y'_{F2} - y_0)),$$
$$\text{round}(C_{1,2}(X'_{F2} - x_0) + D_{1,2}(Y'_{F2} - y_0)))$$

$$0 \leq \text{round}(X_{F2}) < w_2$$

$$0 \leq \text{round}(Y_{F2})) < h_2$$

$$x_0 \leq X'_{F2} < x_0 + w_1$$

$$y_0 \leq Y'_{F2} < y_0 + h_1 \quad (7)$$

As a result, pixel position $(X_{F2}, Y_{F2})$ in the second image F2 corresponding to position $(X'_{F2}, Y'_{F2})$ is obtained (step S5). Generally, when $(X'_{F2}, Y_{F2})$ is an integer, $(X_{F2}, Y_{F2})$ is not always an integer. Therefore, pixel $g_2 (X_{F2}, Y_{F2})$ at position $(X_{F2}, Y_{F2})$ in the second image F2 is usually determined by interpolation of neighboring pixels. In order to obtain the pixel in the simplest manner, the fractional portion of $(X_{F2}, Y_{F2})$ is rounded off so that $(X_{F2}, Y_{F2})$ is an integer, i.e., the most neighboring point is instead used. When the round off operation is indicated by round( ), the most neighboring pixel position of $(X_{F2}, Y_{F2})$ is indicated by $(\text{round}(X_{F2}), \text{round}(Y_{F2}))$.

Therefore, pixel $f(X'_{F2'}, Y'_{F2'})$ at position $(X'_{F2}, Y'_{F2})$ in the synthesized-image memory 37 may be overwritten by pixel $g_2(\text{round}(X_{F2}), \text{round}(Y_{F2}))$ in the second image F2, and can be indicated as follows (step S6):

$$f(X'_{F2}, Y'_{F2}) = g_2(\text{round}(X_{F2}), \text{round}(Y_{F2})) \quad (8)$$
$$= g_2(\text{round}(A_{1'2}(X'_{F2} - x_0) + B_{1'2}(Y'_{F2} - y_0)),$$
$$\text{round}(C_{1'2}(X'_{F2} - x_0) + D_{1'2}(Y'_{F2} - y_0)))$$

However, the operation of checking whether position $(X_{F2}, Y_{F2})$ in the second image F2 corresponding to $(X'_{F2}, Y'_{F2})$ exists in F2 or not must be performed. In order to perform the checking operation in the simplest manner, the coordinates of $(\text{round}(X_{F2}), \text{round}(Y_{F2}))$ are calculated and the coordinates are checked whether they are within the size of the display region of the second image F2 or not, by using the expressions below.

If all the following expressions are satisfied, $(X'_{F2}, Y'_{F2})$ can obtain the corresponding pixel value of the second image F2:

$$0 \leq \text{round}(X_{F2}) < w_2$$

$$0 \leq \text{round}(Y_{F2})) < h_2 \quad (9)$$

where $w_2$ is the width of the second image F2, and $h_2$ is the height of the second image F2.

By using the expressions, it is checked whether the corresponding pixel value of the second image F2 can be obtained at all positions of the synthesized image or not (step S7). Thereafter, it is checked whether, in the synthesized image, the pixel overlaps with the first image F1 which is the previous image or not. This can be done by checking whether the following expressions are satisfied or not (step S11):

$$x_0 \leq X'_{F2} < x_0 + w_1$$

$$y_0 \leq Y'_{F2} < y_0 + h_1 \quad (10)$$

If all the above expressions are satisfied, the pixel overlaps with the first image F1. Therefore, the overwriting operation is not performed. As a result, only a portion of the second image F2 which does not overlap with the first image F1 is overwritten onto the synthesized image (step S12). The overwriting operation of the third image F3 will be described. A pixel position in the third image F3 is indicated by $(X_{F3}, Y_{F3})$, a corresponding pixel position in the synthesized image to be overwritten is indicated by $(X'_{F3}, Y'_{F3})$, and the motion information between the second and third images F2 and F3 is indicated by:

$$\begin{bmatrix} A_{2,3} & B_{2,3} \\ C_{2,3} & D_{2,3} \end{bmatrix} \quad (11)$$

The values of $A_{2,3}$, $B_{2,3}$, $C_{2,3}$, and $D_{2,3}$ may be obtained in the same manner as the motion information between the first and second images F1 and F2. By using these values, the relationship between $(X_{F3}, Y_{F3})$ and $(X'_{F3}, Y'_{F3})$ is defined by the following expression (steps S4 and S5):

$$\begin{bmatrix} X_{F3} \\ Y_{F3} \end{bmatrix} = \begin{bmatrix} A_{2,3} & B_{2,3} \\ C_{2,3} & D_{2,3} \end{bmatrix} \begin{bmatrix} A_{1,2} & B_{1,2} \\ C_{1,2} & D_{1,2} \end{bmatrix} \begin{bmatrix} X'_{F3} - x_0 \\ Y'_{F3} - y_0 \end{bmatrix}$$

$$f(X'_{F3}, Y'_{F3}) = g_3(\text{round}(X_{F3}), \text{round}(Y_{F3}))$$

$$0 \leq \text{round}(X_{F3}) < w_3$$

$$0 \leq \text{round}(Y_{F3})) < h_3 \quad (12)$$

The overwriting operation of the third image F3 is indicated by the above expression and the following expression (steps S6 and S12):

$$f(X'_{F3}, Y'_{F3}) = g_3(\text{round}(X_{F3}), \text{round}(Y_{F3})) \quad (13)$$

The judgement on which pixel in the synthesized image is to be overwritten can be performed in the same manner as the case of the second image F2. First, it is checked whether the point in the synthesized image is within the third image F3 or not, by using the following expressions (step s7):

$$0 \leq \text{round}(X_{F3}) < w_3$$

$$0 \leq \text{round}(Y_{F3})) < h_3 \quad (14)$$

where $w_3$ is the width of the third image F3, and $h_3$ is the height of the third image F3.

Next, it is checked whether the pixel overlaps with the second image F2 which is the previous image or not, by using the following expressions. The position in F2 corresponding to the position $(X'_{F3}, Y'_{F3})$ in the synthesized image is indicated by $(X''_{F3}, Y''_{F3})$. The relationship between $(X'_{F3}, Y'_{F3})$ and $(X''_{F3}, Y''_{F3})$ is strictly identical with that between the synthesized image and the second image F2, and is indicated by the following expressions (steps S8 and S9):

$$\begin{bmatrix} X''_{F3} \\ Y''_{F3} \end{bmatrix} = \begin{bmatrix} A_{1,2} & B_{1,2} \\ C_{1,2} & D_{1,2} \end{bmatrix} \begin{bmatrix} X'_{F3} - x_0 \\ Y'_{F3} - y_0 \end{bmatrix}$$

$$0 \leq \text{round}(X''_{F3}) < w_2$$

$$0 \leq \text{round}(Y''_{F3}) < h_2 \quad (15)$$

Therefore, corresponding position $(X''_{F3}, Y''_{F3})$ in the second image F2 can be obtained from $(X'_{F3}, Y'_{F3})$. It is checked whether $(X''_{F3}, Y''_{F3})$ is within the second image F2 or not, by using the following expressions:

$$0 \leq \text{round}(X''_{F3}) < w_2$$

$$0 \leq \text{round}(Y''_{F3})) < h_2 \quad (16)$$

If all the above expressions are satisfied, the position is within the second image F2, and the portion of the third image F3 overlaps with the second image F2 (steps S10 and S11). At last, each of all the points of the synthesized image (steps S13 and S14) is checked whether it is a point corresponding to the third image F3 and not corresponding to the second image F2 or not. A point which is true in the check is judged to be overwritable, and the point is overwritten by the pixel value of the third image F3 (step S12). Also in the overwriting operations of the fourth image F4 and the subsequent image are repeated in the same manner except that the number of transformation matrices is increased as shown in the following example:

$$\begin{bmatrix} X_{F4} \\ Y_{F4} \end{bmatrix} = \begin{bmatrix} A_{3,4} & B_{3,4} \\ C_{3,4} & D_{3,4} \end{bmatrix} \begin{bmatrix} A_{2,3} & B_{2,3} \\ C_{2,3} & D_{2,3} \end{bmatrix} \begin{bmatrix} A_{1,2} & B_{1,2} \\ C_{1,2} & D_{1,2} \end{bmatrix} \begin{bmatrix} X'_{F4} - x_0 \\ Y'_{F4} - y_0 \end{bmatrix} \quad (17)$$

The above-described procedure is performed on all the images in time series (steps S15, S16, and S17).

In this way, images are overwritten in accordance with the motion amount obtained from the correlation calculating section 5, thereby obtaining a synthesized image such as that shown in FIG. 13.

Next, the image transmitting section 30 and the image receiving section 32 will be described.

The image transmitting section 30 receives synthesized image information from the image synthesizing section 36, and transmits the information.

Various kinds of communication lines are available as a communication line 40. In the embodiment, the communication line is an example of a simple serial connection consisting of only five lines for a clock signal, an enable signal, a data signal, a ground voltage, and a supply voltage (+5 V). The ground voltage and the supply voltage are constant independent of time. In a timing chart of FIG. 14, therefore, only the clock signal, the enable signal, and the data signal are shown. The polygonal lines respectively corresponding to the signals show the voltage levels of the signals. The lower side is the ground level, and the upper side is the supply voltage level. Hereinafter, an operation of setting the voltage of each signal to the supply voltage level is expressed by using a term "raise," an operation of setting the voltage to the ground level is expressed by using a term "lower," the ground level is expressed as "Low," and the supply voltage level is expressed as "High."

In the clock signal, the Low and High states alternatingly appear at equal time intervals.

There are many kinds of image communication formats. Hereinafter, the simplest format will be described. It is assumed that the synthesized image has a width of W and a height of H, the upper left end point of the synthesized image is set as the origin, the rightward direction from the origin is +X direction, and the downward direction is +Y direction. Each pixel consists of the three primary colors of RGB. For a pixel at position (X, Y) in the synthesized image, the R component is indicated by $f_R(X, y)$, the G component by $f_G(X, y)$, and the B component by $f_B(x, y)$. The value of each component is expressed by using one byte.

Figure 14:
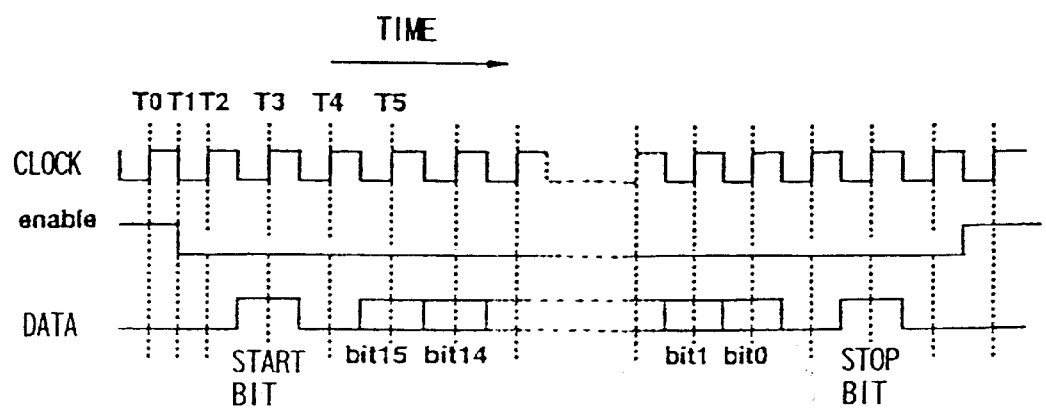
FIG. 14 is a timing chart illustrating states of signal lines in the case where data are transmitted in the invention.

First, as shown in FIG. 14, the width W of the image is transmitted. The value of W consists of 2 bytes, and the bits are transmitted in the sequence of the most significant bit (bit15) to the least significant bit (bit0). When the transmission side is not in the transmission enabled state, the enable signal is raised as shown at time T0 in the figure. When data are to be transmitted, the enable signal is lowered. The timing when the enable signal is lowered is set to be coincident with a timing when the clock signal is lowered, such as time T1. Before date are transmitted, a start bit is transmitted. In other words, the signal level is set to be Low at time T2, High at time T3, and Low at time T4.

The values of 0 and 1 of bits indicative of W are set to be Low and High, respectively. The bits from bit15 to bit0 are sequentially set at a falling edge of the clock signal. In the same manner as the start bit, a stop bit is then transmitted. Finally, the enable signal is raised, and the transmission of the data set is ended.

Next, the height H of the image is transmitted. The procedure of the transmission is strictly identical with that of W. Namely, data of the height H are transmitted in place of the data of W.

Figure 15:
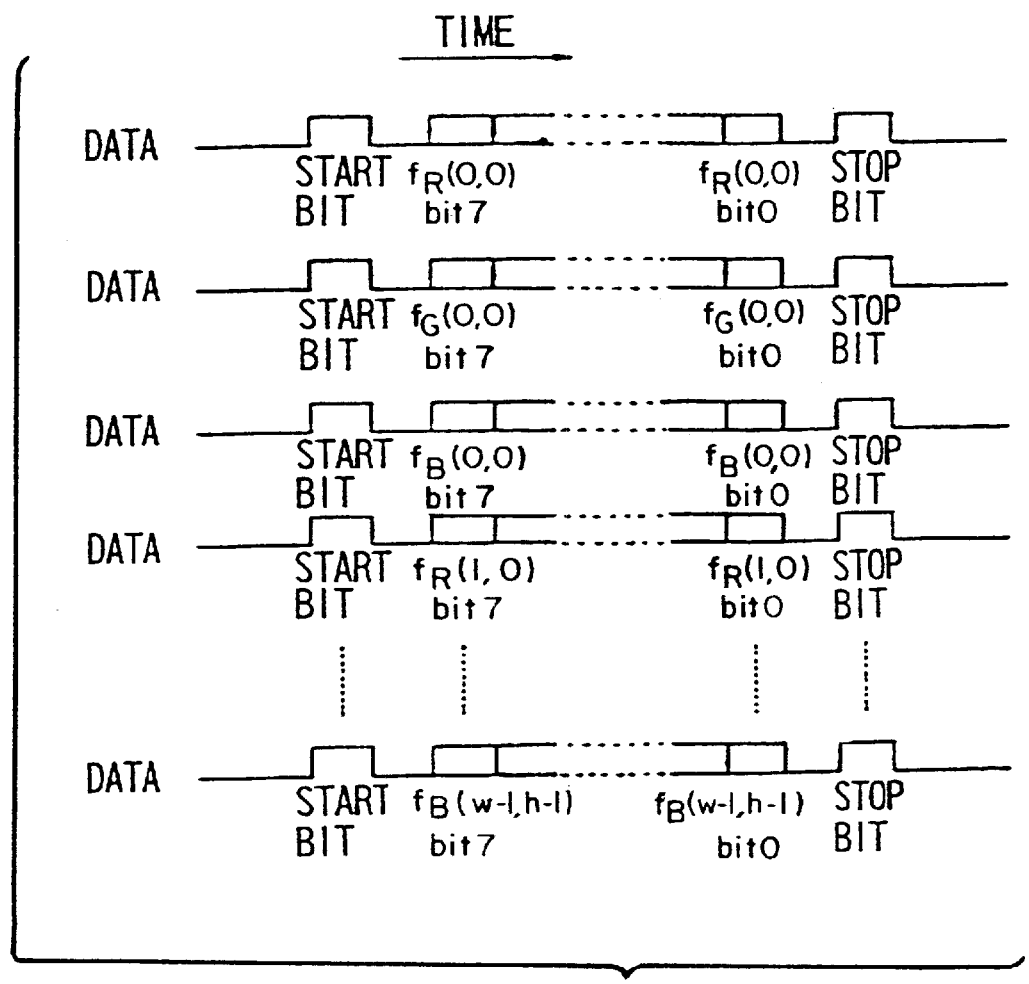
FIG. 15 is a timing chart illustrating an operation of transmitting a synthesized image in the invention.

Next, data of the pixels are transmitted. FIG. 15 is a view illustrating the transmission. The timings of the clock signal and the enable signal are identical with those of FIG. 14, and hence these signals are not shown. The time advances in the direction from the left side to the right side, and from the top to the bottom. In the same manner as W and the like, data are transmitted with being interposed between the start and stop bits. Since each of the R, G, and B components consists of 8-bit data, data of each pixel are transmitted in the form of three separate blocks, or in the sequence of R, G, and B.

Therefore, the transmission of all the pixels can be realized by performing (H×W×3) times the transmission of 8-bit data. The sequence of the transmission of the pixels is previously determined. For example, $f_R(0, 0)$ is first transmitted, and $f_G(0, 0)$ and $f_B(0, 0)$ are then transmitted in sequence. Thereafter, $f_R(1, 0)$, $f_G(1, 0)$, and $f_B(1, 0)$ are transmitted, and $f_R(2, 0)$, $f_G(2, 0)$, and $f_B(2, 0)$ are then transmitted. When $f_B(W-1, 0)$ at the right end is transmitted, data of the next line are then transmitted in the sequence starting from $f_R(0, 1)$ at the left end, in the same manner. The data which is finally transmitted is $f_B(W-1, H-1)$.

In the reception side, operations opposite to those described above are performed.

First, the enable signal is monitored. When the enable signal becomes Low, the value of the signal is read at a rising edge of the clock signal. After the reading of the signal is started, it is confirmed whether the signal is changed in the sequence of Low, High, and Low, i.e., the start bit is transmitted or not. Next, data of bits of a predetermined number are read. Then, it is confirmed whether the signal is changed in the sequence of Low, High, and Low, i.e., the stop bit is transmitted or not. When the enable signal becomes High, the reading of the value of the signal is ended.

Specifically, with respect to the first and second data, the predetermined bit number is 16 because the data indicative of the total width and height consist of 16 bits, respectively. With respect to the other data, the predetermined bit number is 8 because these data are pixel data. As a result of two data receptions, the total width W and height H are known. Then, the reception of 8-bit data is performed (W×H×3) times. The received pixel data are interpreted in a predetermined sequence. In the example described above, $f_R(0, 0)$ is first interpreted, and thereafter $f_G(0, 0)$, $f_B(0, )$, and $f_R(1, 0)$ are interpreted in this sequence. When $f_B(W-1, 0)$ at the right end is interpreted, data of the next line are then interpreted in the sequence starting from $f_R(0, 1)$ at the left end, in the same manner. The data which is finally interpreted is $f_B(W-1, H-1)$.

As a result, the transmission and reception of the synthesized image are enabled.

[Embodiment 2]

Figure 2:
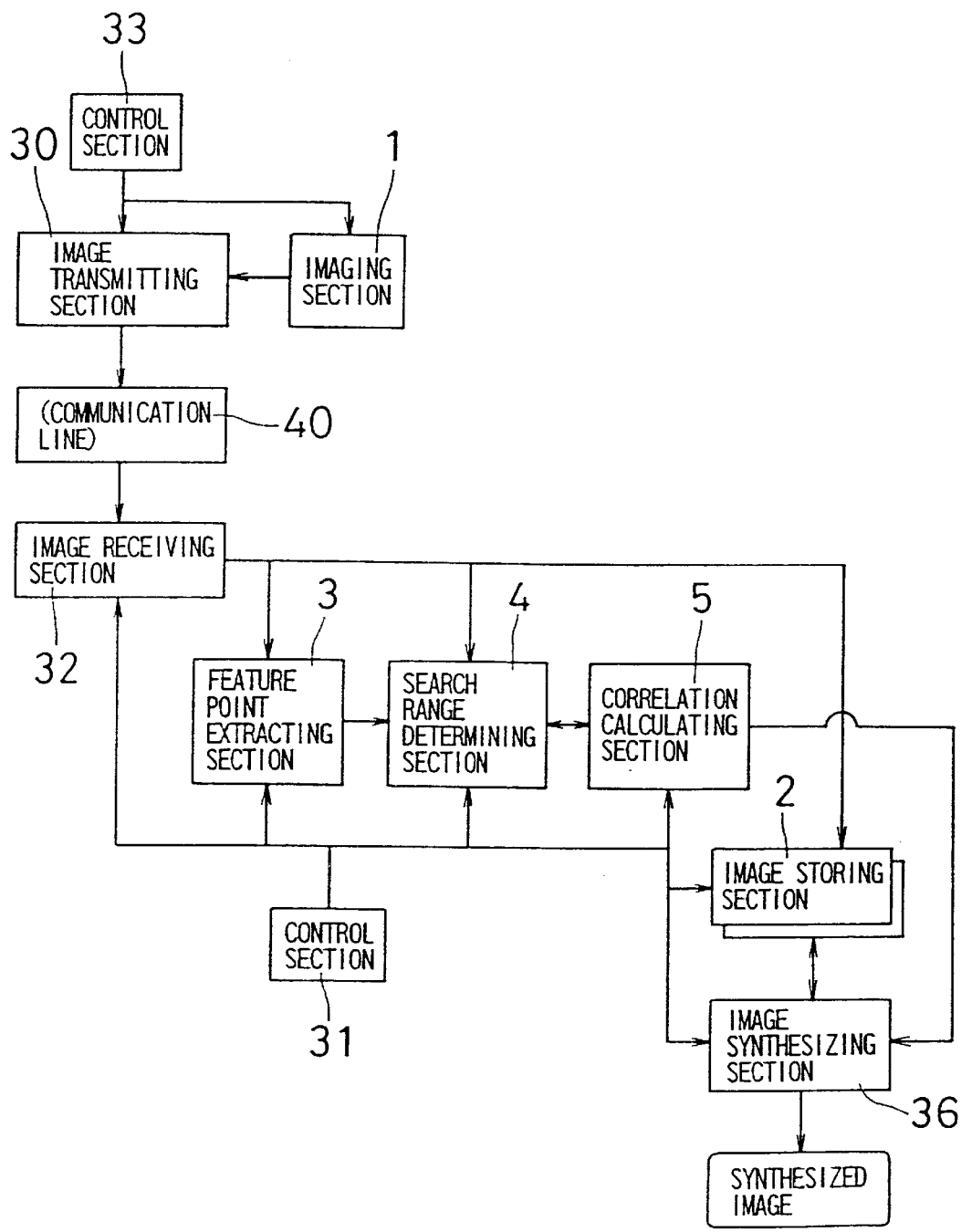
FIG. 2 is a block diagram showing the configuration of an image synthesis and communication apparatus of a second embodiment of the invention.

FIG. 2 is a block diagram showing the configuration of an image synthesis and communication apparatus of a second embodiment of the invention. The image synthesis and communication apparatus comprises: an imaging section 1 which is realized by an optical system for taking an image, a CCD, or the like; an image transmitting section 30 which transmits an image transferred from the imaging section 1; a control section 33 which controls the components of the transmission side; an image receiving section 32 which receives the image transmitted from the image transmitting section 30; an image storing section 2 which stores image data transferred from the image receiving section 32; a feature point extracting section 3 which extracts a point used for a pixel calculation; a search range determining section 4 which determines a search range for a correlation calculation; a correlation calculating section 5 which obtains correlations among pixels and outputs a motion amount; an image synthesizing section 36 which synthesizes an image; and a control section 31 which controls the components of the reception side.

The imaging section 1, the image transmitting section 30, and the control section 33 which are shown in FIG. 2 may be disposed integrally with or separately from the image synthesis and communication apparatus on the image information reception side. Alternatively, these sections may be disposed in another image synthesis and communication apparatus.

In the embodiment, images taken by the imaging section 1 are transmitted and received as they are. Also the transmission and reception can be realized by a communication method which is strictly identical with that used in the above-described transmission and reception of a synthesized image.

Namely, the width W and the height H of an image taken by the imaging section 1 are first transmitted, and pixel information of (W×H×3) bytes is then transmitted.

The image receiving section 32 also processes received data in the strictly same manner as the image receiving section 32 of the first embodiment.

The images received by the image receiving section 32 are stored in the image storing section 2, and then synthesized together by the image synthesizing section 36. The synthesization may be performed in the same manner as that of the first embodiment.

[Embodiment 3]

Figure 3:
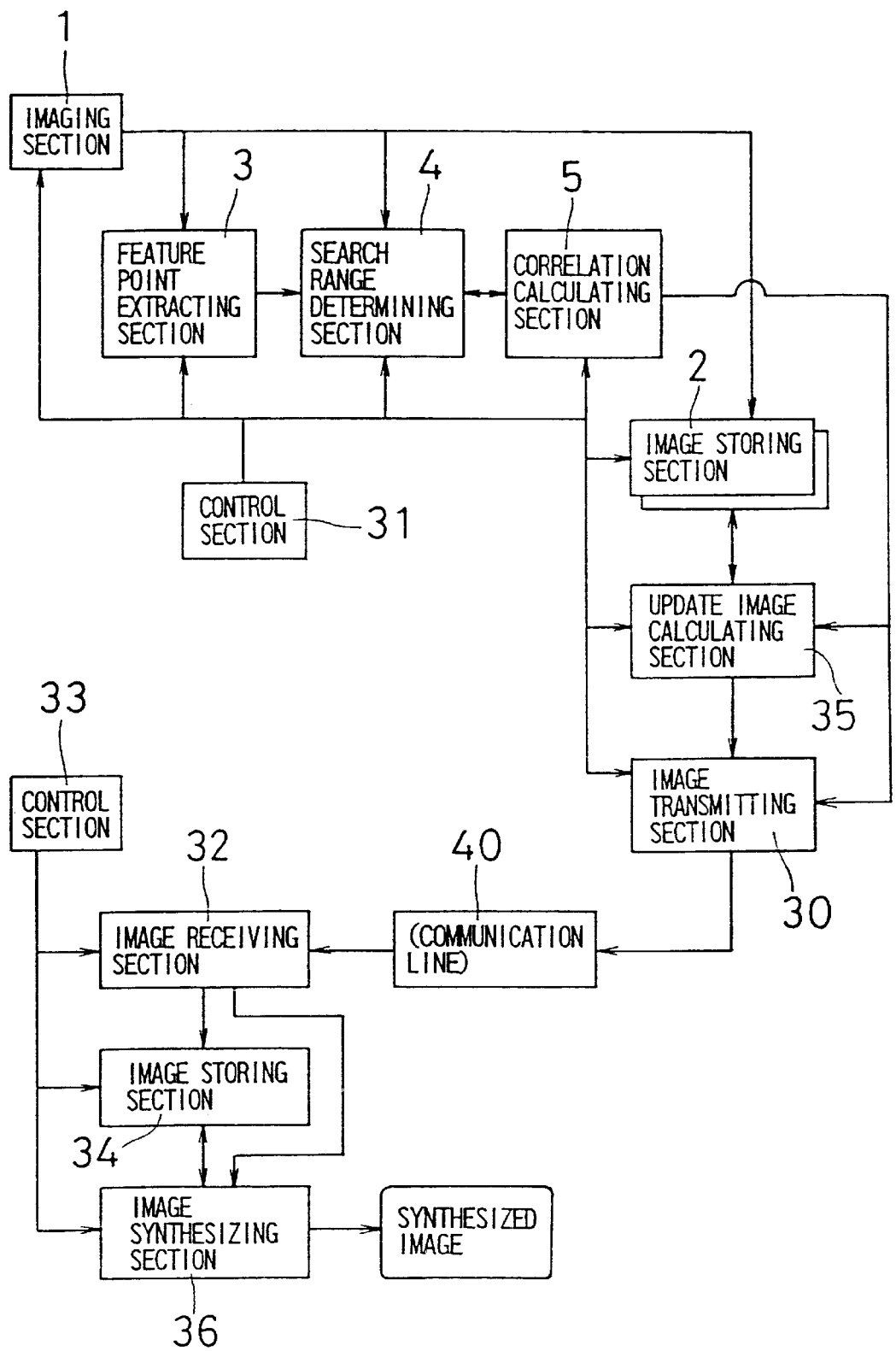
FIG. 3 is a block diagram showing the configuration of an image synthesis and communication apparatus of a third embodiment of the invention.

FIG. 3 is a block diagram showing the configuration of an image synthesis and communication apparatus of a third embodiment of the invention. The image synthesis and communication apparatus comprises: an imaging section 1 which is realized by an optical system for taking an image, a CCD, or the like; an image storing section 2 which stores image data transferred from the imaging section 1; a feature point extracting section 3 which extracts a point used for a pixel calculation; a search range determining section 4 which determines a search range for a correlation calculation; a correlation calculating section 5 which obtains correlations among pixels and outputs a motion amount; an update image calculating section 35 which calculates a portion (update image) that does not overlap with the previous image, on the basis of the motion amount obtained by the correlation calculating section 5 and the image data of the image storing section 2; an image transmitting section 30 which transmits the motion amount obtained from the correlation calculating section 5, and the update image obtained by the update image calculating section 35; a control section 31 which controls the components of the transmission side; an image receiving section 32 which receives the motion amount and the update image transmitted from the image transmitting section 30; an image storing section 34 which stores image data transferred from the image receiving section 32; an image synthesizing section 36 which synthesizes an image on the basis of images of the image storing section and the motion amount obtained from the image receiving section 32; and a control section 33 which controls the components of the reception side.

Figure 16:
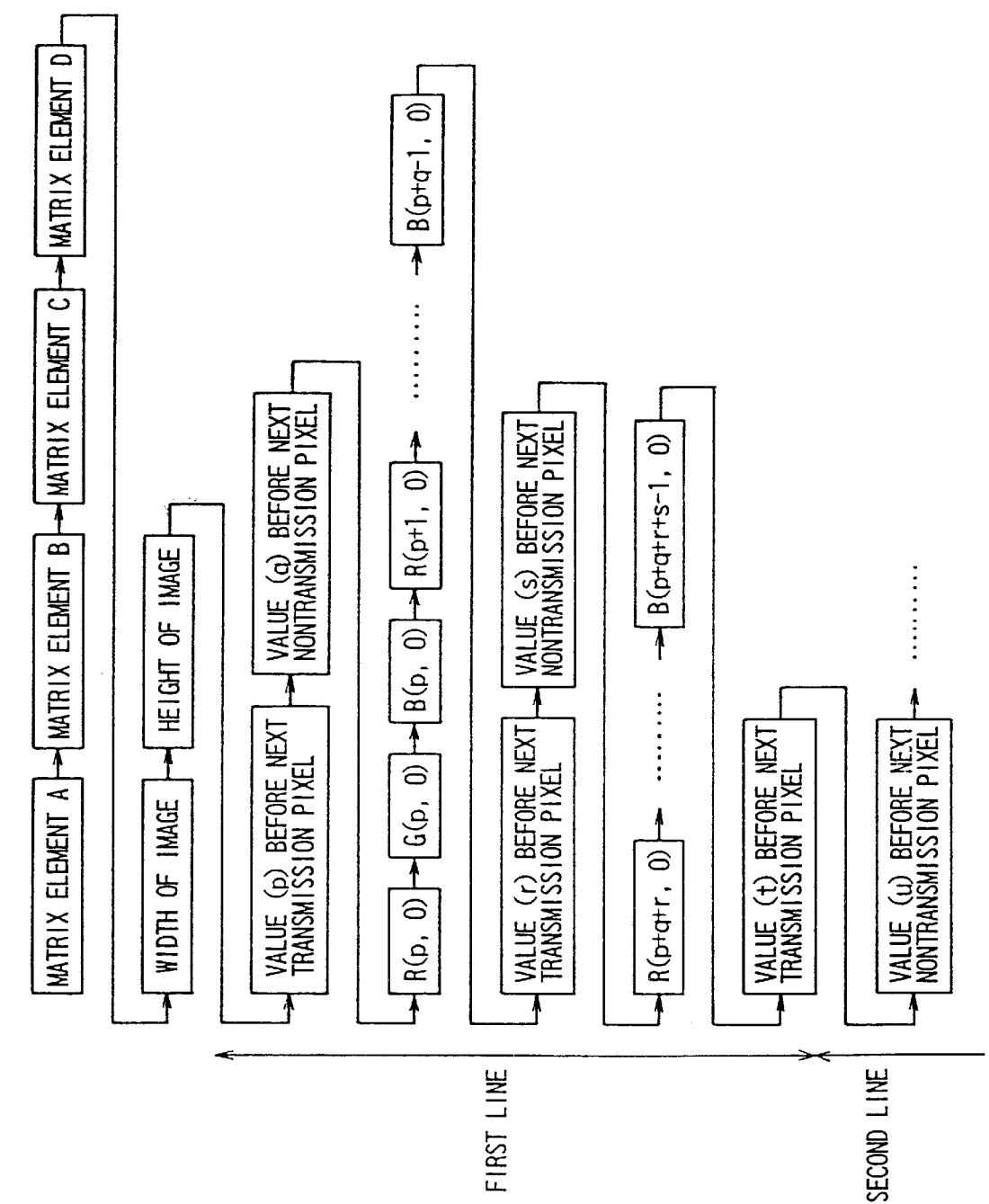
FIG. 16 is a diagram illustrating an operation of transmitting an updated image in the invention.

FIG. 16 is a diagram illustrating the format of transmission and reception information of the image synthesis and communication apparatus of the third embodiment of the invention. Information to be transmitted and received includes the motion amount obtained from the correlation calculating section 5, and the partial image obtained from the update image calculating section 35. In an actual transmission, in the same manner as the first embodiment, lines such as an enable signal, a clock signal, a supply voltage, and a ground level, a start bit and stop bit in a data signal serving as a transmission sequence, and the like are required. The procedure is identical with that of the first embodiment, and hence only the data portion is illustrated.

The motion amount may be a value of the matrix of 2×2 which has been used in the description of the image synthesization. When the synthesization is to be performed without rotation, expansion, and reduction, and with using only a parallel movement amount, only shift amounts in X and Y directions are required.

First, as shown in FIG. 16, values of a matrix for performing an affine transformation between the previous image and the current image are transmitted. In the case of the third image F3, for example, a transformation between the second image F2 and the third image F3 is to be performed. When the expression form described in the above example is used, $A_{2,3}$, $B_{2,3}$, $C_{2,3}$, and $D_{2,3}$ are sequentially transmitted. The bit number depends on the required accuracy. When data are expressed in floating-point form, 32 bits are sufficient.

After parameters are transmitted, the width and height of an image are transmitted. In the embodiment, these values are 2-byte data.

Next, a partial image obtained from the update image calculating section 35 is transmitted. The update image calculating section 35 calculates a portion which does not overlap with the previous image. The manner of the calculation is substantially identical with the method described in conjunction with the image synthesizing section 36. In the example of the third image F3 and the second image F2, when a point in the third image F3 is indicated by (x, y) and a point of the second image F2 corresponding to the point is indicated by (x', y'), transformation expressions from (x, y) to (x', y') are as follows. In the expressions, $(x_1, y_1)$ and $(x_2, Y_2)$ are points in the third image F3 and correspond to points $(x'_1, y'_1)$ and $(x'_2, y'_2)$ in the second image F2, respectively.

$$\begin{bmatrix} x' \\ y' \end{bmatrix} = \frac{1}{x_1 y_2 - x_2 y_1}$$

$$0 \leq \text{round}(x) < w_2$$
$$0 \leq \text{round}(y) < h_2 \quad (18)$$

From the above, the position in the second image F2 to which a point in the third image F3 is to be transferred is known. Therefore, when both the following expressions:

$$0 \leq \text{round}(x) < w_2$$
$$0 \leq \text{round}(y) < h_2 \quad (19)$$

are satisfied, the points overlap with each other. This process is performed on all points in the third image F3, and then it is possible to know points in the third image F3 which do not overlap with the second image F2. Hereinafter, a point which does not overlap with the previous image is called a transmission pixel, and that which overlaps with the previous image is called a nontransmission pixel. When all transmission pixels are to be transmitted, the transmission must be performed so that the reception side can distinguish a transmission pixel from a nontransmission pixel. Alternatively, a mask image may be separately transmitted. In the alternative, however, the amount of data to be transmitted is increased. Therefore, the transmission is performed by using the feature that regions which do not overlap with the previous image are usually continuous regions.

Figure 17:
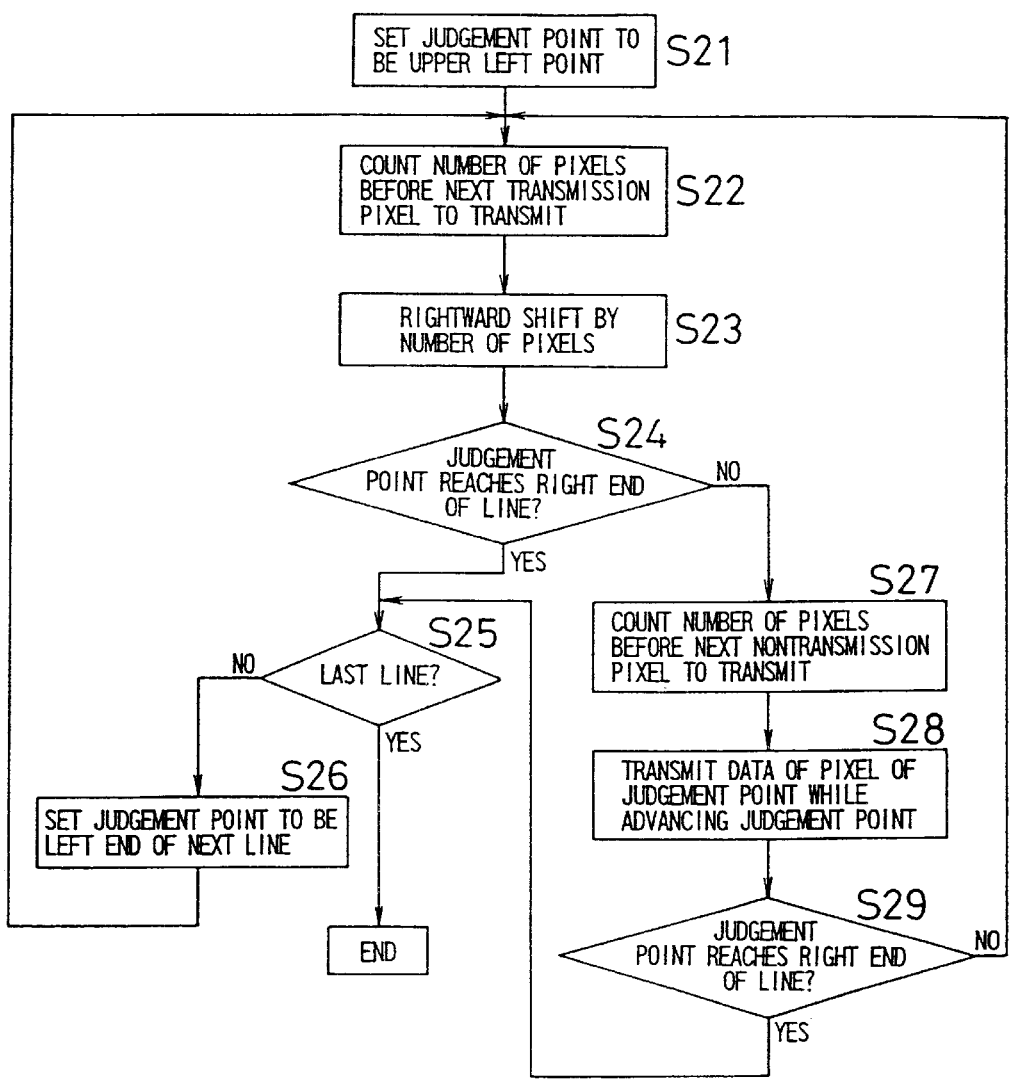
FIG. 17 is a flowchart illustrating a procedure of determining transmission pixels in the invention.

FIG. 17 is a flowchart illustrating a procedure of judging a transmission pixel and a nontransmission pixel.

First, the position "judgement point" where the judgement on a transmission pixel and a nontransmission pixel is started is set to be the upper left point of the third image F3 (step S21). Next, "number of pixels before the next transmission pixel" in the line is counted in the rightward direction as seen from the judgement point (step S22). When the judgement point is a transmission pixel, the number is 0. When the judgement point is a nontransmission pixel, a p number of nontransmission pixels are continuous, and a transmission pixel exists after the nontransmission pixels, "number of pixels before the next transmission pixel" is p. If there is no transmission pixel after a judgement point in the line, the number of remaining pixels in the line is set to be "number of pixels before the next transmission pixel." When "number of pixels before the next transmission pixel" is obtained, the number is expressed as a 2-byte data and then transmitted.

Next, the judgement point is rightward advanced by "number of next transmission pixels" (step S23). If it is judged in step S24 that, at this timing, the judgement point reaches the right end of the line, the control proceeds to step S25. If the line is not the last line, the control proceeds to step S26. The left end point of the next line is set to be the judgement point, and the control then returns to the process of step s22 of counting "number of pixels before the next transmission pixel." In the example of FIG. 16, after "value (t) before the next transmission pixel" is transmitted, the judgement point is jumped to the next line. If it is judged in step S24 that the judgement point has not yet reached the right end, the control proceeds to step S27. The judgement point is set to be the next transmission pixel, and "number of pixels before the next nontransmission pixel" is counted in the rightward direction as seen from the judgement point. If a q number of transmission pixels are continuous, the number is q. Then, "number of pixels before the next nontransmission pixel" is expressed as a 2-byte data and then transmitted (step S27).

Next, data of pixels, i.e., the values of R, G, and B the number of each of which corresponds to the number of the pixels are sequentially transmitted. In the example of FIG. 16, data starting from R(p, 0) and ending at B(p+q−1, 0) are transmitted (step S28).

If it is judged in step S29 that, at this timing, the judgement point reaches the right end of the line, and the line is not the last line, the left end point of the next line is set to be the judgement point, and the control then returns to step S25. If the judgement point has not yet reached the right end, the judgement point is set to be the next nontransmission pixel, and the control then returns to the initial process, i.e., the process in step S22 of counting "number of pixels before the next transmission pixel." If it is judged in step S25 that the judgement point reaches the right end of the last line, the process is totally ended. In this way, an image of a portion which does not overlap with the previous image can be transmitted.

Figure 18:
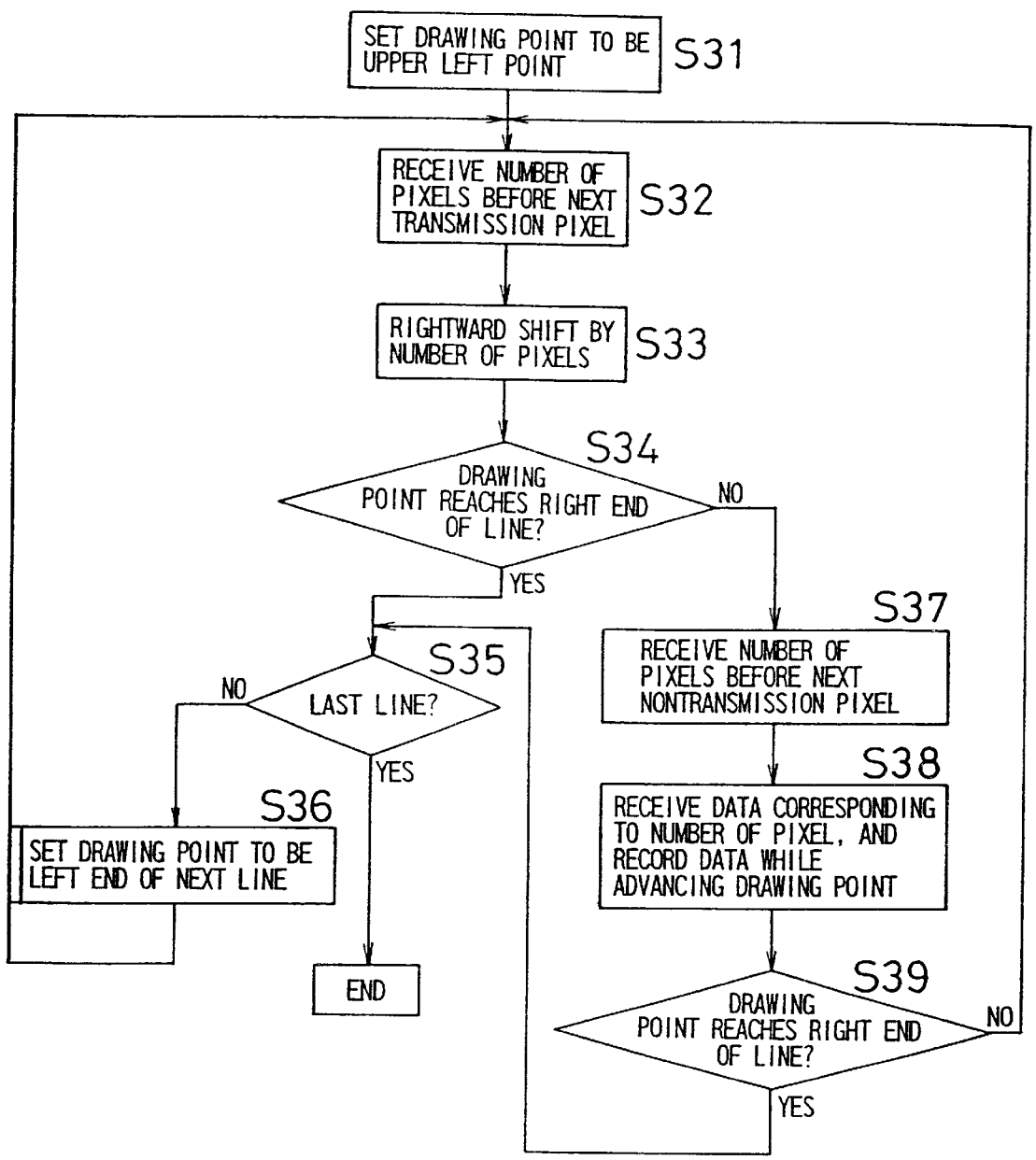
FIG. 18 is a flowchart illustrating a procedure of storing reception pixels in the invention.
Figure 19:
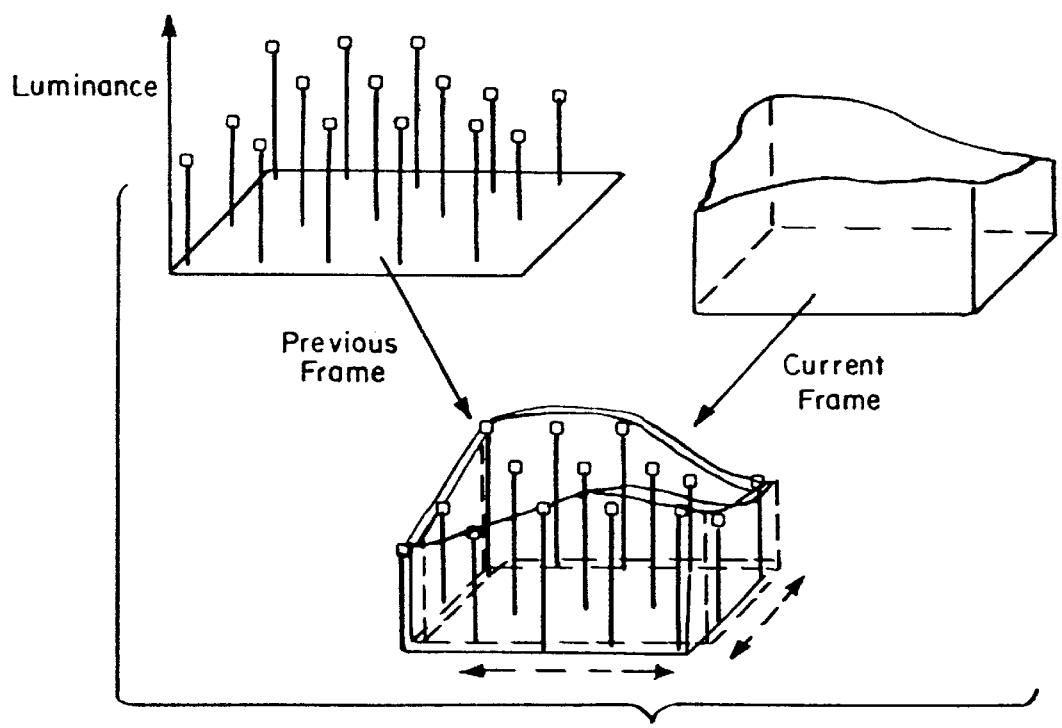
FIG. 19 is a view diagrammatically showing the representative point method of the prior art.
Figure 20:
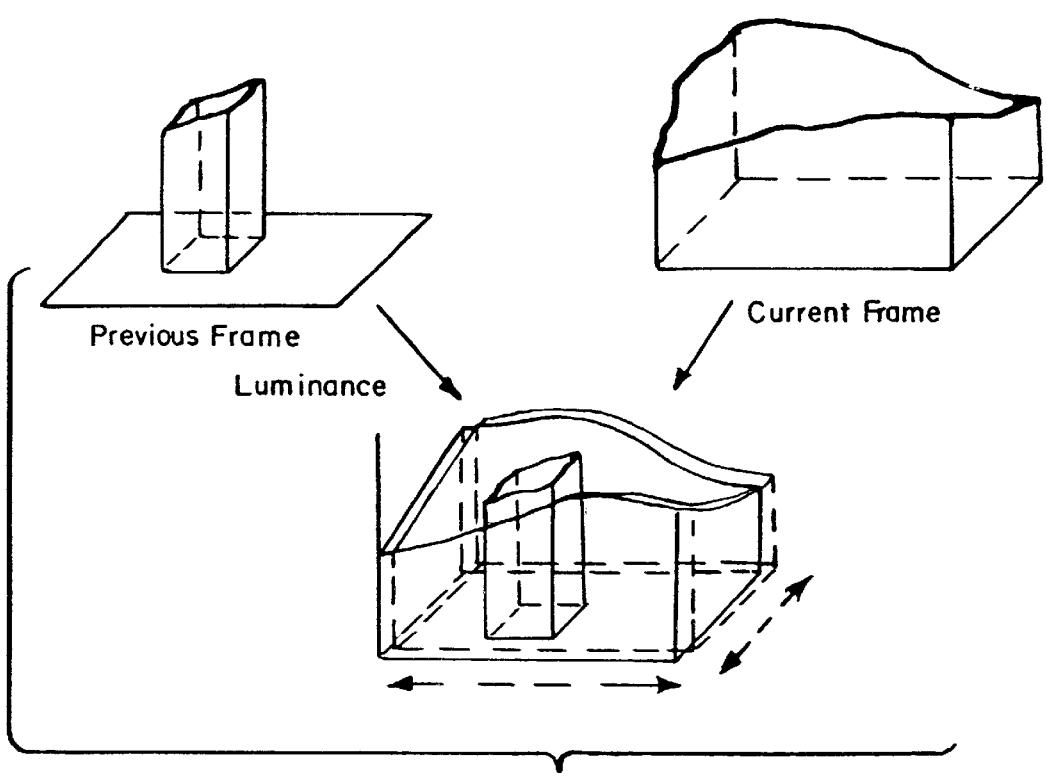
FIG. 20 is a view diagrammatically showing the block matching method of the prior art.

The reception side performs operations which are contrary to the above-described operations. FIG. 18 is a flowchart illustrating a procedure of storing reception pixels.

It is assumed that values of a transformation matrix, and data of images including the width and the height are already received.

A region for storing received images is previously reserved in the image storing section 34 on the reception side in FIG. 3. The size of the region is determined on the basis of the width and height of the images which have been already received. A pixel data can be written at a specific position in the storage region by determining a position "drawing point" relative to the origin, i.e., the upper left end of the reserved region. First, the drawing point is set to be the upper left end of the reserved storage region (step S31).

Next, "number of pixels before the next transmission pixel" is received (step S32). Since pixels of this number are nontransmission pixels and are not transmitted, the drawing point is rightward shifted by this number (step S33). In step S34, it is judged whether the drawing point reaches the right end or not. If the drawing point reaches the right end, the control proceeds to step S35 to judge whether the line is the last line or not. If the line is not the last line, the drawing point is set in step S36 to be the left end of the next line. The control then returns to step S32 or the process of receiving the value before the next transmission pixel.

If it is judged in step S34 that the drawing point has not yet reached the right end, the control proceeds to step S37 and "number of pixels before the next nontransmission pixel" is received. In step S38, since data of pixels of this number are transmitted, the data are received, and, concurrently with the data reception, the data are written into the image storing section 34. Specifically, since data of each pixel are received in the sequence of R, G, and B, the pixel data are written at the position of the drawing point by using these values. Next, the drawing point is rightward shifted by one, and the R, G, and B data of the next pixel are received. The above process is repeatedly performed for each of the pixels.

When the process is ended, it is judged in step S39 whether the drawing point reaches the right end or not. If the drawing point reaches the right end, the control proceeds to step S35 to judge whether the line is the last line or not. If the line is not the last line, the drawing point is set to be the left end of the next line. The control then returns to step S32 or the process of receiving the value before the next transmission pixel. If it is judged in step S35 that the drawing point reaches the right end of the last line, the reception of the image data is ended.

As a result, images of a minimum necessary total size have been received.

By repeating these processes, plural image data can be recorded onto the image storing section. Next, an image is synthesized from these data. The method of the synthesization is strictly identical with the above-described method. Data required for the synthesization are a transformation matrix between two continuous images, and pixel data of each image.

As the elements of the transformation matrix, transmitted data may be used. Although all of pixel data of each image are not transmitted, the partial image data recorded on the image storing section are sufficient for the synthesization because only a portion which does not overlap with the previous image is used in the synthesization. Therefore, an image can be synthesized from the received data.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image synthesis apparatus comprising:

imaging means for inputting images in time series;

image storing means for storing the images inputted from the imaging means;

feature point extracting means for extracting a point of a large luminance change from an image of a current frame, as a feature point;

search range determining means for determining a predetermined region of an image of a single subsequent frame, as a search range for a correlation calculation;

correlation calculating means for obtaining correlations between the feature point and pixels in the search range;

update image calculating means for obtaining an image of a newly-imaged portion from a motion amount obtained from the correlation calculating means;

image transmitting means for transmitting the motion amount obtained from the correlation calculating means, and a non-overlapping partial image obtained from the update image calculating means;

image receiving means for receiving the motion amount and the non-overlapping partial image transmitted from the image transmitting means; and image synthesizing means for synthesizing an image from the motion amount and the non-overlapping partial image obtained from the image receiving means.

2. The image synthesis apparatus of claim 1, wherein the search range determining means determines the search range on the basis of the motion amount obtained from images of current and previous frames.

3. The image synthesis apparatus of claim 1, wherein the feature point extracting means extracts, as a feature point, a point of a large luminance change from plural regions where coordinates in one direction coincide with one another in an image of a current frame, the search range determining means determines a search range for a correlation calculation, for each of the regions of a subsequent frame, and the correlation calculating means performs a correlation calculation for each of the regions.

* * * * *